US012576687B2

(12) United States Patent
    Michikawauchi

(10) Patent No.: US 12,576,687 B2
(45) Date of Patent: Mar. 17, 2026

(54) THERMAL MANAGEMENT SYSTEM, VEHICLE INCLUDING THE SAME, AND METHOD FOR CONTROLLING THERMAL MANAGEMENT CIRCUIT

(71) Applicant: TOYOTA JIDOSHA KABUSHIKI KAISHA, Toyota (JP)

(72) Inventor: Ryo Michikawauchi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 18/404,034

(22) Filed: Jan. 4, 2024

(65) Prior Publication Data

US 2024/0246387 A1      Jul. 25, 2024

(30) Foreign Application Priority Data

Jan. 20, 2023     (JP) ................................. 2023-007162

(51) Int. Cl.
    *B60H 1/00*          (2006.01)
(52) U.S. Cl.
    CPC ..... *B60H 1/00278* (2013.01); *B60H 1/00807* (2013.01); *B60H 1/00885* (2013.01)

(58) Field of Classification Search
    CPC ............ B60H 1/00278; B60H 1/00807; B60H 1/00885
    See application file for complete search history.

(56) References Cited

U.S. PATENT DOCUMENTS

| | | | |
|---|---|---|---|
| 2019/0221899 A1* | 7/2019 | Tomai ................. | H01M 10/613 |
| 2021/0316597 A1* | 10/2021 | Okamura ........... | B60H 1/00278 |
| 2022/0009309 A1 | 1/2022 | Miura et al. | |
| 2024/0190210 A1* | 6/2024 | Michikawauchi ........................... | B60H 1/00278 |

FOREIGN PATENT DOCUMENTS

JP          2020-165604 A     10/2020

* cited by examiner

*Primary Examiner* — Marc E Norman
(74) *Attorney, Agent, or Firm* — Oliff PLC

(57)          ABSTRACT

A switching device of a thermal management system is configured to switch a thermal management circuit to a first circuit mode or a second circuit mode based on the relationship between a battery temperature and a threshold temperature. When a predetermined condition that the amount of change in chiller temperature associated with switching of the circuit mode of the thermal management circuit is expected to be larger than a reference amount is satisfied before the switching of the circuit mode, the control device adjusts the threshold temperature so that the amount of change in chiller temperature becomes smaller than the reference amount.

7 Claims, 16 Drawing Sheets

<FIRST CIRCUIT MODE>

<SECOND CIRCUIT MODE>

<COMPARATIVE EXAMPLE>

<EMBODIMENT>

<COMPARATIVE EXAMPLE>

<EMBODIMENT>

FIG. 14

<FIRST CIRCUIT MODE>

FIG. 15

<SECOND CIRCUIT MODE>

THERMAL MANAGEMENT SYSTEM, VEHICLE INCLUDING THE SAME, AND METHOD FOR CONTROLLING THERMAL MANAGEMENT CIRCUIT

CROSS-REFERENCE TO RELATED APPLICATION

This application claims priority to Japanese Patent Application No. 2023-007162 filed on Jan. 20, 2023, incorporated herein by reference in its entirety.

BACKGROUND

1. Technical Field

The present disclosure relates to thermal management systems, vehicles including the same, and methods for controlling a thermal management circuit.

2. Description of Related Art

A refrigeration cycle device disclosed in Japanese Unexamined Patent Application Publication No. 2020-165604 (JP 2020-165604 A) is applied to an air conditioner for a battery electric vehicle. In this refrigeration cycle device, an electric heater is controlled to reduce a decrease in temperature of blown air in an air conditioning mode (cooling-heating mode, cooling-dehumidification heating mode, etc.), thereby improving comfort in a vehicle cabin (see FIGS. 6 and 7 of JP 2020-165604 A).

SUMMARY

A thermal management circuit having the following configuration has been proposed. The thermal management circuit includes: a battery through which a heat medium flows; a heat exchanger (such as a radiator) through which the heat medium flows; a refrigeration cycle through which a refrigerant flows; a chiller configured to exchange heat between the heat medium and the refrigerant; and a switching device configured to switch the thermal management circuit between or among a plurality of circuit modes. The circuit modes include a first circuit mode and a second circuit mode. The first circuit mode is a circuit mode in which the chiller is thermally disconnected from the battery and is thermally connected to the heat exchanger. The second circuit mode is a circuit mode in which the chiller is thermally connected to the battery.

In such a thermal management circuit, when the circuit mode is switched between the first circuit mode and the second circuit mode during a heating operation of the refrigeration cycle, the heating temperature may change significantly. This may result in deterioration of air conditioning comfort.

The present disclosure reduces deterioration of air conditioning comfort.

A thermal management system according to a first aspect of the present disclosure includes a thermal management circuit. The thermal management circuit includes: a battery configured to allow a heat medium to flow through the battery; a heat exchanger configured to allow the heat medium to flow through the heat exchanger; a refrigeration cycle configured to allow a refrigerant to flow through the refrigeration cycle; a chiller configured to exchange heat between the heat medium and the refrigerant; a battery temperature sensor configured to detect a battery temperature, the battery temperature being a temperature of the heat medium flowing through the battery; a chiller temperature sensor configured to detect a chiller temperature, the chiller temperature being a temperature of the heat medium flowing through the chiller; and a switching device configured to switch the thermal management circuit between or among a plurality of circuit modes. The circuit modes include a first circuit mode in which the chiller is thermally disconnected from the battery and is thermally connected to the heat exchanger, and a second circuit mode in which the chiller is thermally connected to the battery. The thermal management system further includes a control device configured to control the thermal management circuit. The control device is configured to switch the thermal management circuit to the first circuit mode or the second circuit mode based on a relationship between the battery temperature and a threshold temperature. The control device is configured to, when a predetermined condition that an amount of change in the chiller temperature associated with switching of the circuit mode of the thermal management circuit is expected to be larger than a reference amount is satisfied before the switching of the circuit mode, adjust the threshold temperature in such a manner that the amount of change in the chiller temperature becomes smaller than the reference amount.

In the above thermal management system, the control device may be configured to control the thermal management circuit to the first circuit mode when the battery temperature becomes lower than a first threshold temperature. The predetermined condition may be satisfied when a first temperature difference between the chiller temperature and the battery temperature becomes larger than a first reference amount, and the control device may be configured to, when the predetermined condition is satisfied, set the first threshold temperature to a value lower than when the first temperature difference is not larger than the first reference amount.

In the above thermal management system, the control device may be configured to control the thermal management circuit to the second circuit mode when the battery temperature becomes higher than a second threshold temperature. The predetermined condition may be satisfied when a second temperature difference between the chiller temperature and a heat exchanger temperature becomes larger than a second reference amount, the heat exchanger temperature being a temperature of the heat medium flowing through the heat exchanger. The control device may be configured to, when the predetermined condition is satisfied and the chiller temperature is higher than the battery temperature, set the second threshold temperature to a value lower than when the second temperature difference is not larger than the second reference amount. The control device may be configured to, when the predetermined condition is satisfied and the chiller temperature is lower than the battery temperature, set the second threshold temperature to a value higher than when the second temperature difference is not larger than the second reference amount.

A vehicle according to a second aspect of the present disclosure includes the above thermal management system.

In a method for controlling a thermal management circuit according to a third aspect of the present disclosure, the thermal management circuit includes: a chiller configured to exchange heat between a heat medium flowing through a battery and a heat exchanger and a refrigerant flowing through a refrigeration cycle; and a switching device configured to switch the thermal management circuit between or among a plurality of circuit modes. The circuit modes include a first circuit mode in which the chiller is thermally disconnected from the battery and is thermally connected to the heat exchanger, and a second circuit mode in which the chiller is thermally connected to the battery. The method includes: detecting a battery temperature, the battery temperature being a temperature of the heat medium flowing through the battery; detecting a chiller temperature, the chiller temperature being a temperature of the heat medium flowing through the chiller; switching the thermal management circuit to the first circuit mode or the second circuit mode based on a relationship between the battery temperature and a threshold temperature. The method further includes when, before switching the thermal management circuit to the first circuit mode or the second circuit mode, an amount of change in the chiller temperature associated with the switching of the circuit mode of the thermal management circuit is expected to be larger than a reference amount, adjusting the threshold temperature in such a manner that the amount of change in the chiller temperature becomes smaller than the reference amount.

In the above method, the threshold temperature may include a first threshold temperature. In switching the thermal management circuit to the first circuit mode or the second circuit mode, the thermal management circuit may be switched to the first circuit mode when the battery temperature becomes lower than the first threshold temperature. In adjusting the threshold temperature in such a manner that the amount of change in the chiller temperature becomes smaller than the reference amount, when a first temperature difference between the chiller temperature and the battery temperature is larger than a first reference amount, the first threshold temperature may be set to a value lower than when the first temperature difference is not larger than the first reference amount.

In the above method, the threshold temperature may include a second threshold temperature. In switching the thermal management circuit to the first circuit mode or the second circuit mode, the thermal management circuit may be switched to the second circuit mode when the battery temperature becomes higher than the second threshold temperature. In adjusting the threshold temperature in such a manner that the amount of change in the chiller temperature becomes smaller than the reference amount, when a second temperature difference between the chiller temperature and a heat exchanger temperature is larger than a second reference amount and the chiller temperature is higher than the battery temperature, the second threshold temperature may be set to a value lower than when the second temperature difference is not larger than the second reference amount, the heat exchanger temperature being a temperature of the heat medium flowing through the heat exchanger. In adjusting the threshold temperature in such a manner that the amount of change in the chiller temperature becomes smaller than the reference amount, when the second temperature difference is larger than the second reference amount and the chiller temperature is lower than the battery temperature, the second threshold temperature may be set to a value higher than when the second temperature difference is not larger than the second reference amount.

According to the present disclosure, deterioration of air conditioning comfort can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 shows an example of the configuration of a thermal management circuit;

FIG. 14 illustrates an example of a first circuit mode according to the second embodiment;

FIG. 15 illustrates an example of a second circuit mode according to the second embodiment.

DETAILED DESCRIPTION OF EMBODIMENTS

Embodiments of the present disclosure will be described in detail below with reference to the drawings. The same or corresponding portions are denoted by the same signs throughout the drawings, and description thereof will not be repeated.

Hereinafter, a configuration in which a thermal management system according to the present disclosure is mounted on a vehicle 10 will be described as an example. The vehicle 10 is a vehicle equipped with a traction battery, and is, for example, a battery electric vehicle (BEV). The vehicle 10 may be a hybrid electric vehicle (HEV), a plug-in hybrid electric vehicle (PHEV), or a fuel cell electric vehicle (FCEV). However, the thermal management system according to the present disclosure is not limited to vehicle applications.

First Embodiment

System Configuration

Figure 1:
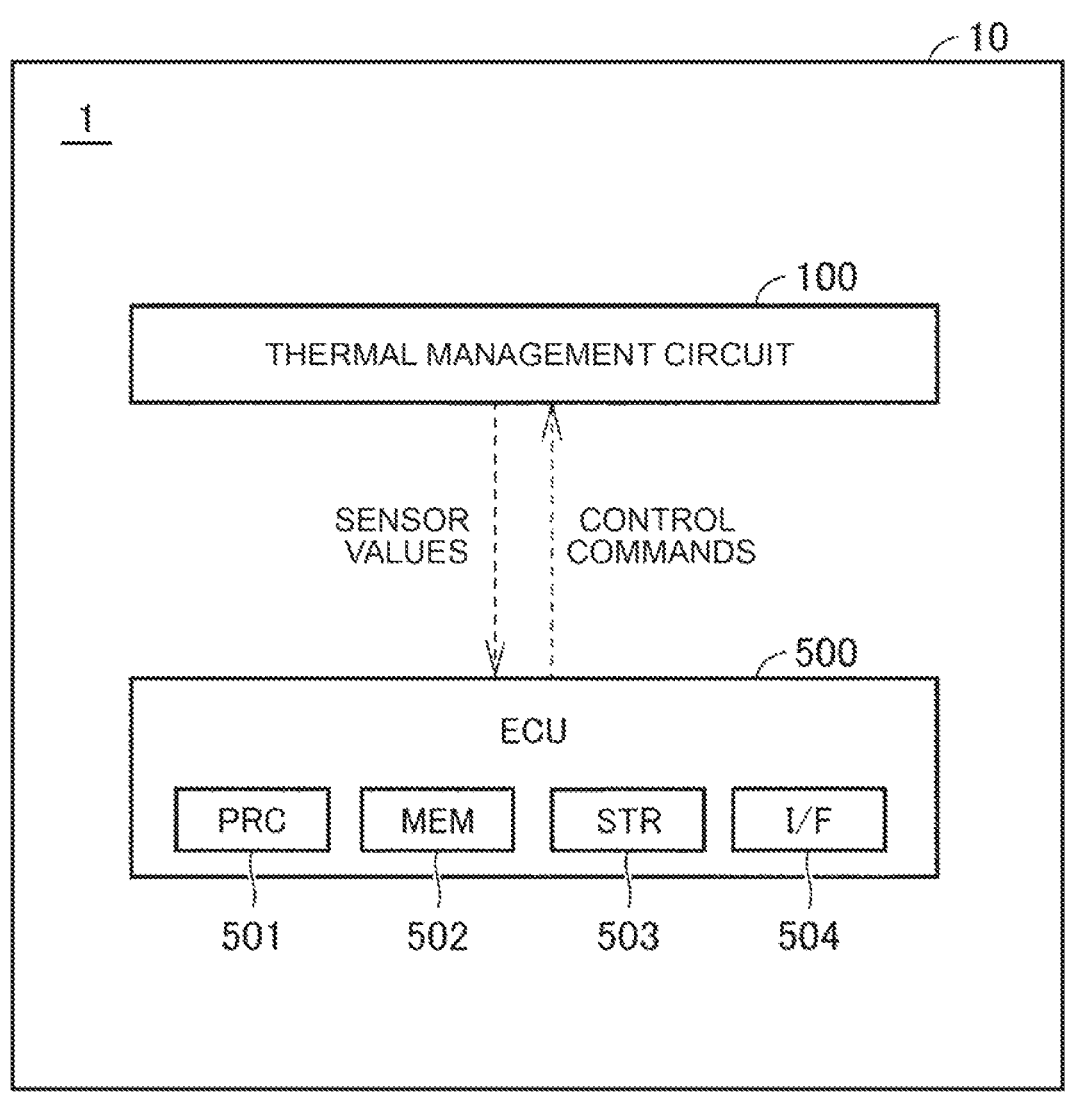
FIG. 1 shows an example of the overall configuration of a thermal management system according to a first embodiment of the present disclosure.

FIG. 1 shows an example of the overall configuration of a thermal management system according to a first embodiment of the present disclosure. A thermal management system 1 includes a thermal management circuit 100 and an electronic control unit (ECU) 500.

The thermal management circuit 100 is configured so that a heat medium and a refrigerant flow therein. The thermal management circuit 100 outputs various sensor values to the ECU 500. The configuration of the thermal management circuit 100 will be described with reference to FIG. 2.

The ECU 500 controls the thermal management circuit 100 by outputting control commands to the thermal management circuit 100 according to the sensor values from the thermal management circuit 100. The ECU 500 includes a processor 501, a memory 502, a storage 503, and an interface 504. The processor 501 is, for example, a central processing unit (CPU) or a micro-processing unit (MPU). The memory 502 is, for example, a random access memory (RAM). The storage 503 is a rewritable nonvolatile memory such as a hard disk drive (HDD), a solid state drive (SSD), or a flash memory. The storage 503 stores system programs including an operating system (OS), and control programs including computer-readable codes that are necessary for control calculations. The processor 501 implements various processes by reading the system programs and the control programs, loading them into the memory 502, and executing them. The interface 504 controls communication between the ECU 500 and components of the thermal management circuit 100.

The ECU 500 corresponds to the "control device" of the present disclosure. The ECU 500 may be divided into a plurality of ECUs by function. Although an example in which the ECU 500 includes one processor 501 is shown in FIG. 1, the ECU 500 may include a plurality of processors. The same applies to the memory 502 and the storage 503.

As used herein, the "processor" is not limited to a processor in a narrow sense that performs processes by stored programs, and may include hardwired circuitry such as an application-specific integrated circuit (ASIC) and a field-programmable gate array (FPGA). Therefore, the term "processor" may read processing circuitry that performs processes defined in advance by computer-readable codes and/or hardwired circuitry.

Circuit Configuration

Figure 2:
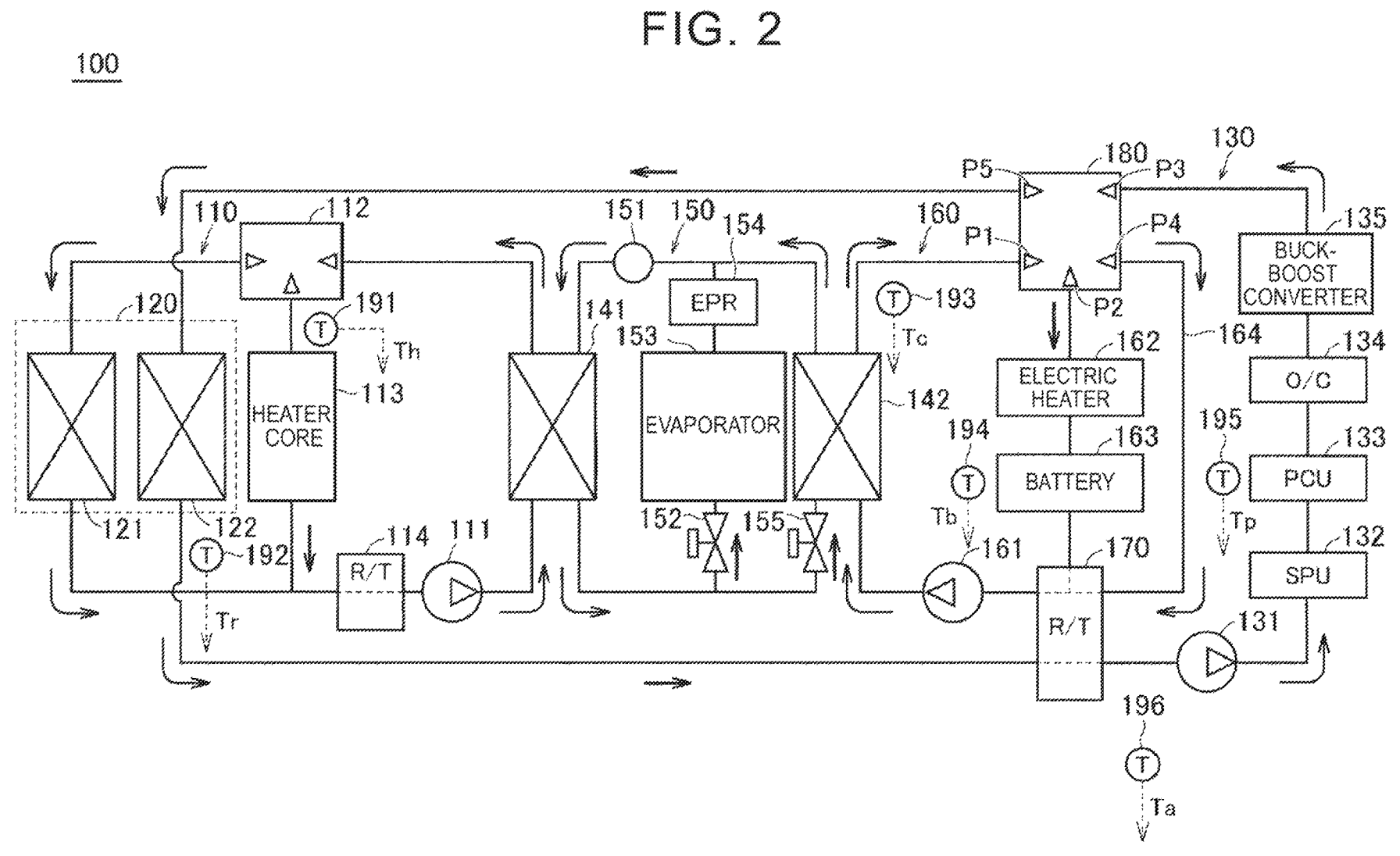

FIG. 2 shows an example of the configuration of the thermal management circuit 100. The thermal management circuit 100 includes, for example, a high temperature (HT) circuit 110, a radiator 120, a low temperature (LT) circuit 130, a condenser 141, a chiller 142, a refrigeration cycle 150, a battery circuit 160, a reservoir tank (R/T) 170, a five-way valve 180, and temperature sensors 191 to 196.

The high temperature circuit 110 includes, for example, a water pump (W/P) 111, a three-way valve 112, a heater core 113, and a reservoir tank 114. The radiator 120 includes a high temperature radiator 121 and a low temperature radiator 122. The low temperature circuit 130 includes, for example, a water pump 131, a smart power unit (SPU) 132, a power control unit (PCU) 133, an oil cooler (O/C) 134, and a buck-boost converter 135. The refrigeration cycle 150 includes, for example, a compressor 151, an expansion valve 152, an evaporator 153, an evaporative pressure regulator (EPR) 154, and an expansion valve 155. The battery circuit 160 includes, for example, a water pump 161, an electric heater 162, a battery 163, and a bypass path 164.

A heat medium (usually hot water) circulating in the high temperature circuit 110 flows through either or both of a first path and a second path. The first path is a path of "water pump 111-condenser 141-three-way valve 112-heater core 113-reservoir tank 114-water pump 111." The second path is a path of "water pump 111-condenser 141-three-way valve 112-high temperature radiator 121-reservoir tank 114-water pump 111."

The water pump 111 circulates the heat medium in the high temperature circuit 110 according to a control command from the ECU 500. The condenser 141 receives heat dissipated from the refrigerant circulating in the refrigeration cycle 150 to heat the heat medium circulating in the high temperature circuit 110. The three-way valve 112 switches between the first path and the second path according to a control command from the ECU 500. The heater core 113 exchanges heat between the heat medium circulating in the high temperature circuit 110 and air to be blown into a vehicle cabin to heat the air (heating operation). The reservoir tank 114 stores part of the heat medium flowing in the high temperature circuit 110 (heat medium that has overflowed due to a pressure increase) to maintain the pressure and amount of heat medium in the high temperature circuit 110.

The high temperature radiator 121 is connected to the high temperature circuit 110. The high temperature radiator 121 is disposed downstream of a grille shutter (not shown), and exchanges heat between air outside the vehicle 10 and the heat medium. The low temperature radiator 122 is connected to the low temperature circuit 130. The low temperature radiator 122 is disposed near the high temperature radiator 121, and exchanges heat with the high temperature radiator 121. The low temperature radiator 122 corresponds to the "heat exchanger" according to the present disclosure.

The heat medium (coolant) circulating in the low temperature circuit 130 flows through a path of "water pump 131-SPU 132-PCU 133-oil cooler 134-buck-boost converter 135-five-way valve 180-low temperature radiator 122-reservoir tank 170-water pump 131."

The water pump 131 circulates the heat medium in the low temperature circuit 130 according to a control command from the ECU 500. The SPU 132 controls charge and discharge of the battery 163 according to a control command from the ECU 500. The PCU 133 converts direct current (DC) power supplied from the battery 163 to alternating current (AC) power to supply the AC power to a motor (not shown) contained in a transaxle according to a control command from the ECU 500. The oil cooler 134 circulates lubricating oil for the motor using an electrical oil pump (EOP) (not shown). The oil cooler 134 cools the transaxle through heat exchange between the heat medium circulating in the low temperature circuit 130 and the lubricating oil for the motor. The buck-boost converter 135 steps up or steps down the voltage of the battery 163 according to a control command from the ECU 500. The SPU 132, the PCU 133, the oil cooler 134, and the buck-boost converter 135 are cooled by the heat medium circulating in the low temperature circuit 130.

The condenser 141 is connected to both the high temperature circuit 110 and the refrigeration cycle 150. The condenser 141 dissipates heat from the refrigerant circulating in the refrigeration cycle 150. The chiller 142 is connected to both the refrigeration cycle 150 and the battery circuit 160. The chiller 142 exchanges heat between the refrigerant circulating in the refrigeration cycle 150 and the heat medium circulating in the battery circuit 160.

The refrigerant (gas-phase refrigerant or liquid-phase refrigerant) circulating in the refrigeration cycle 150 flows through either or both of a first path and a second path. The first path is a path of "compressor 151-condenser 141-expansion valve 152-evaporator 153-EPR 154-compressor 151." The second path is a path of "compressor 151-condenser 141-expansion valve 155-chiller 142-compressor 151."

The compressor 151 compresses the gas-phase refrigerant circulating in the refrigeration cycle 150 according to a control command from the ECU 500. The rotational speed of the compressor 151 is controlled (in this example, proportional-integral (PI) controlled) according to, for example, the deviation between the target and current values of a blow-out temperature. The condenser 141 dissipates heat from the high-temperature, high-pressure gas-phase refrigerant compressed by the compressor 151 to condense the gas-phase refrigerant into a liquid-phase refrigerant. The high-temperature, high-pressure refrigerant compressed by the compressor 151 dissipates heat to the heat medium (hot water) circulating in the high temperature circuit 110 through heat exchange in the condenser 141. Air (heating air) heated by the heat dissipated from the heated hot water in the heater core 113 is sent into the vehicle cabin from an air vent (heating operation). The expansion valve 152 expands the high-pressure liquid-phase refrigerant condensed by the condenser 141 to decompress this liquid-phase refrigerant. The evaporator 153 exchanges heat between air blown to the evaporator 153 and the liquid-phase refrigerant to cool the air (cooling operation). The EPR 154 controls the flow rate of the refrigerant flowing into the EPR 154 from the evaporator 153 to keep the pressure in the evaporator 153 substantially constant. Like the expansion valve 152, the expansion valve 155 expands the high-pressure liquid-phase refrigerant condensed by the condenser 141 to decompress this liquid-phase refrigerant. The chiller 142 evaporates the liquid-phase refrigerant decompressed by the expansion valve 155. Heat is thus taken away from the heat medium circulating in the battery circuit 160, so that this heat medium is cooled.

The heat medium circulating in the battery circuit 160 flows through either or both of a first path and a second path. The first path is a path of "water pump 161-chiller 142-five-way valve 180-electric heater 162-battery 163-reservoir tank 170-water pump 161." The second path is a path of "water pump 161-chiller 142-five-way valve 180-bypass path 164-reservoir tank 170-water pump 161."

The water pump 161 circulates the heat medium in the battery circuit 160 according to a control command from the ECU 500. The chiller 142 exchanges heat between the refrigerant circulating in the refrigeration cycle 150 and the heat medium circulating in the battery circuit 160 to cool the heat medium circulating in the battery circuit 160. The electric heater 162 heats the heat medium according to a control command from the ECU 500. The battery 163 supplies traction power to the motor contained in the transaxle. The battery 163 may be heated with the electric heater 162 or may be cooled with the chiller 142. The bypass path 164 is provided to cause the heat medium to bypass the electric heater 162 and the battery 163. When the heat medium flows through the bypass path 164, a change in temperature of the heat medium associated with heat absorption and heat dissipation between the heat medium and the battery 163 can be reduced.

In this example, the reservoir tank 170 is connected to both the low temperature circuit 130 and the battery circuit 160. The reservoir tank 170 stores part of the heat medium flowing in the low temperature circuit 130 and the battery circuit 160 to maintain the pressure and amount of heat medium in the low temperature circuit 130 and the battery circuit 160.

The five-way valve 180 is connected to the low temperature circuit 130 and the battery circuit 160. The five-way valve 180 switches the path of the thermal medium in the low temperature circuit 130 and the battery circuit 160 according to a control command from the ECU 500. The five-way valve 180 corresponds to the "switching device" according to the present disclosure.

The temperature sensor 191 detects the temperature of the heat medium flowing through the heater core 113 (heater core medium temperature Th). The temperature sensor 192 detects the temperature of the heat medium flowing through the low temperature radiator 122 (radiator medium temperature Tr). The temperature sensor 193 detects the temperature of the heat medium (may be a refrigerant instead of the heat medium) flowing through the chiller 142 (chiller medium temperature Tc). The temperature sensor 194 detects the temperature of the heat medium flowing through the battery 163 (battery medium temperature Tb). The temperature sensor 195 detects the temperature of the heat medium flowing through the PCU 133 (powertrain medium temperature Tp). The temperature sensor 196 detects the temperature outside the vehicle 10 (outside air temperature Ta). The sensors output sensor values indicating detection results to the ECU 500. The radiator medium temperature Tr corresponds to the "heat exchanger temperature" according to the present disclosure. The battery medium temperature Tb corresponds to the "battery temperature" according to the present disclosure.

The ECU 500 generates a control command based on the sensor values acquired from the temperature sensors 191 to 195 in the thermal management circuit 100, and outputs the generated control command to the thermal management circuit 100.

Circuit Modes

The thermal management circuit 100 has a plurality of circuit modes. The ECU 500 can switch between or among the circuit modes by controlling the five-way valve 180. Of the circuit modes, a first circuit mode and a second circuit mode will be described below.

Figure 3:
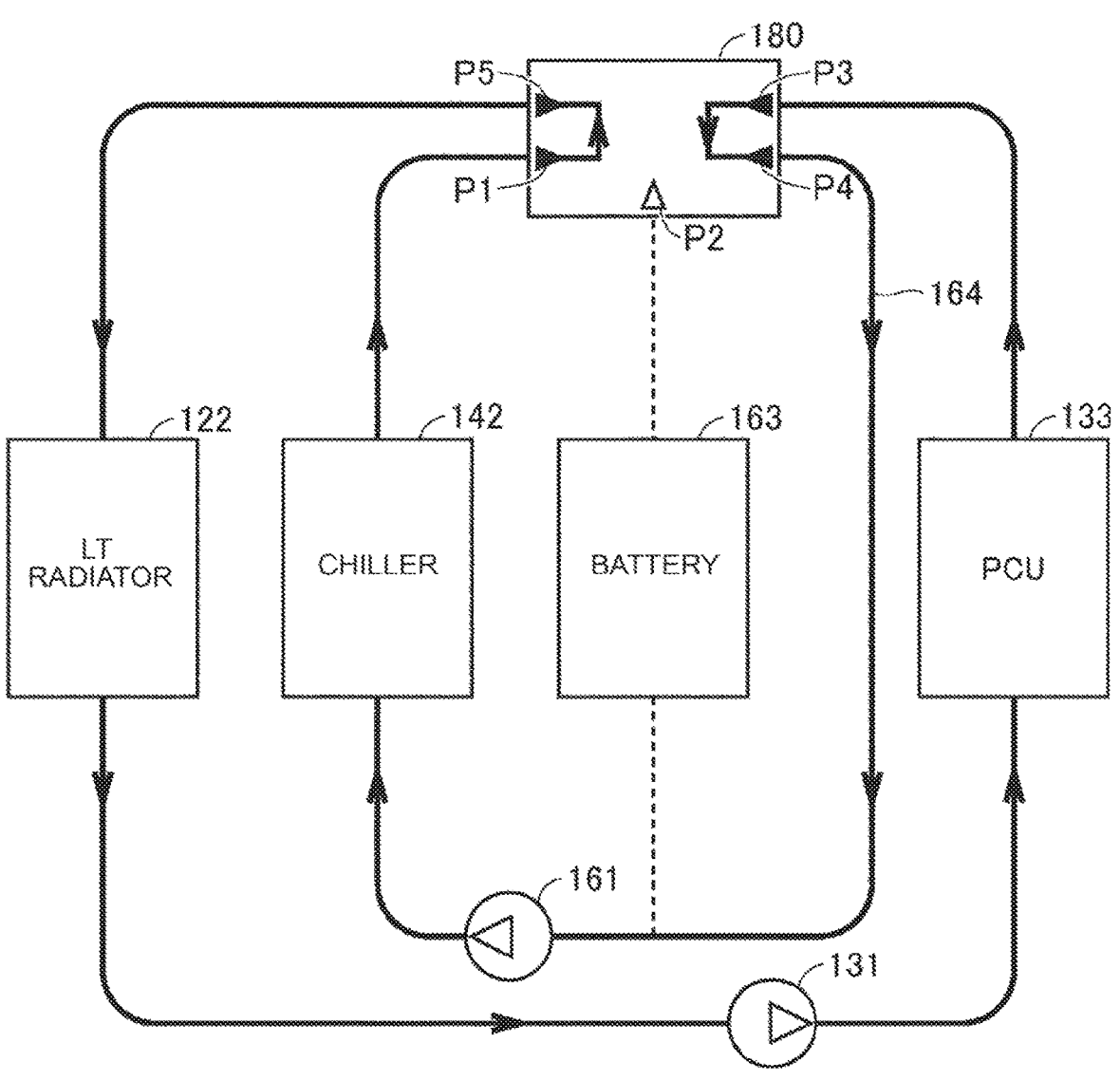
FIG. 3 illustrates an example of a first circuit mode according to the first embodiment.
Figure 4:
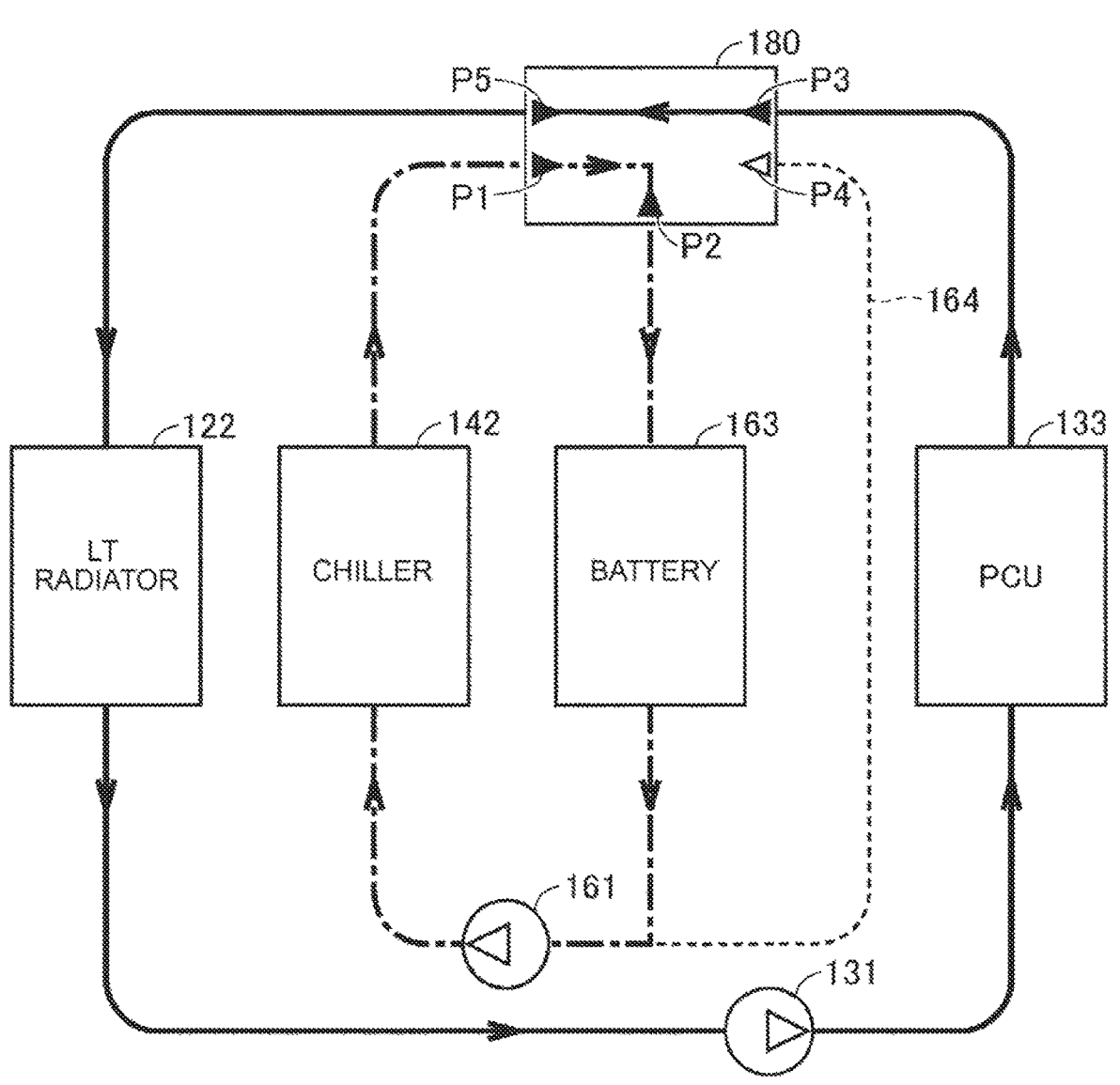
FIG. 4 illustrates an example of a second circuit mode according to the first embodiment.

FIG. 3 illustrates an example of the first circuit mode according to the first embodiment. FIG. 4 illustrates an example of the second circuit mode according to the first embodiment. In order to facilitate understanding, FIGS. 3 and 4 show only the representative components out of the components of the thermal management system 1 described with reference to FIG. 1.

Referring to FIG. 3, the first circuit mode is a mode in which the chiller 142 is thermally disconnected from the battery 163 (battery circuit 160) and is thermally connected to the low temperature radiator 122 (low temperature circuit 130). In the first circuit mode illustrated in FIG. 3, the five-way valve 180 is controlled so that ports P1, P5 communicate with each other and ports P3, P4 communicate with each other. The low temperature circuit 130 and the battery circuit 160 are thus connected in series. More specifically, a single path is formed such that the heat medium flows in the order of the water pump 131, the PCU 133, the port P3, the port P4, the bypass path 164, the water pump 161, the chiller 142, the port P1, the port P5, the low temperature radiator 122, and the water pump 131.

After a sufficient amount of time has elapsed in the first circuit mode, the chiller medium temperature Tc, the radiator medium temperature Tr, and the powertrain medium temperature Tp are approximately equal to each other. Therefore, in the following description, the radiator medium temperature Tr may be used or the powertrain medium temperature Tp may be used instead of the chiller medium temperature Tc in the first circuit mode.

Referring to FIG. 4, the second circuit mode is a circuit mode in which the chiller 142 is thermally connected to the battery 163. In the second circuit mode illustrated in FIG. 4, the five-way valve 180 is controlled so that the port P1 and a port P2 communicate with each other and the ports P3, P5 communicate with each other. The low temperature circuit 130 and the battery circuit 160 are thus connected in parallel (in other words, formed independently of each other). More specifically, a first path (low temperature circuit 130) is formed such that the heat medium flows in the order of the water pump 131, the PCU 133, the port P3, the port P5, the low temperature radiator 122, and the water pump 131, and a second path (battery circuit 160) is formed such that the heat medium flows in the order of the water pump 161, the chiller 142, the port P1, the port P2, the battery 163, and the water pump 161.

After a sufficient amount of time has elapsed in the second circuit mode, the radiator medium temperature Tr and the powertrain medium temperature Tp are approximately equal to each other. The chiller medium temperature Tc and the battery medium temperature Tb are also approximately equal to each other. Therefore, in the following description, the powertrain medium temperature Tp may be used instead of the radiator medium temperature Tr in the second circuit mode. The battery medium temperature Tb may be used instead of the chiller medium temperature Tc in the second circuit mode.

The first circuit mode is not limited to the mode shown in FIG. 3 as long as the chiller 142 is not thermally connected to the battery 163 and is thermally connected to the low temperature radiator 122. The second circuit mode is not limited to the mode shown in FIG. 4 as long as the chiller 142 is thermally connected to the battery 163.

Rapid Change in Heating Temperature

During the heating operation of the thermal management system 1 configured as described above, a situation may arise where the heating temperature (temperature of heating air at the air vent) changes rapidly with switching of the circuit mode.

Before Start of Cooling

The heating operation before the start of cooling of the battery 163 will be described by comparing a comparative example and the present embodiment.

Figure 5:
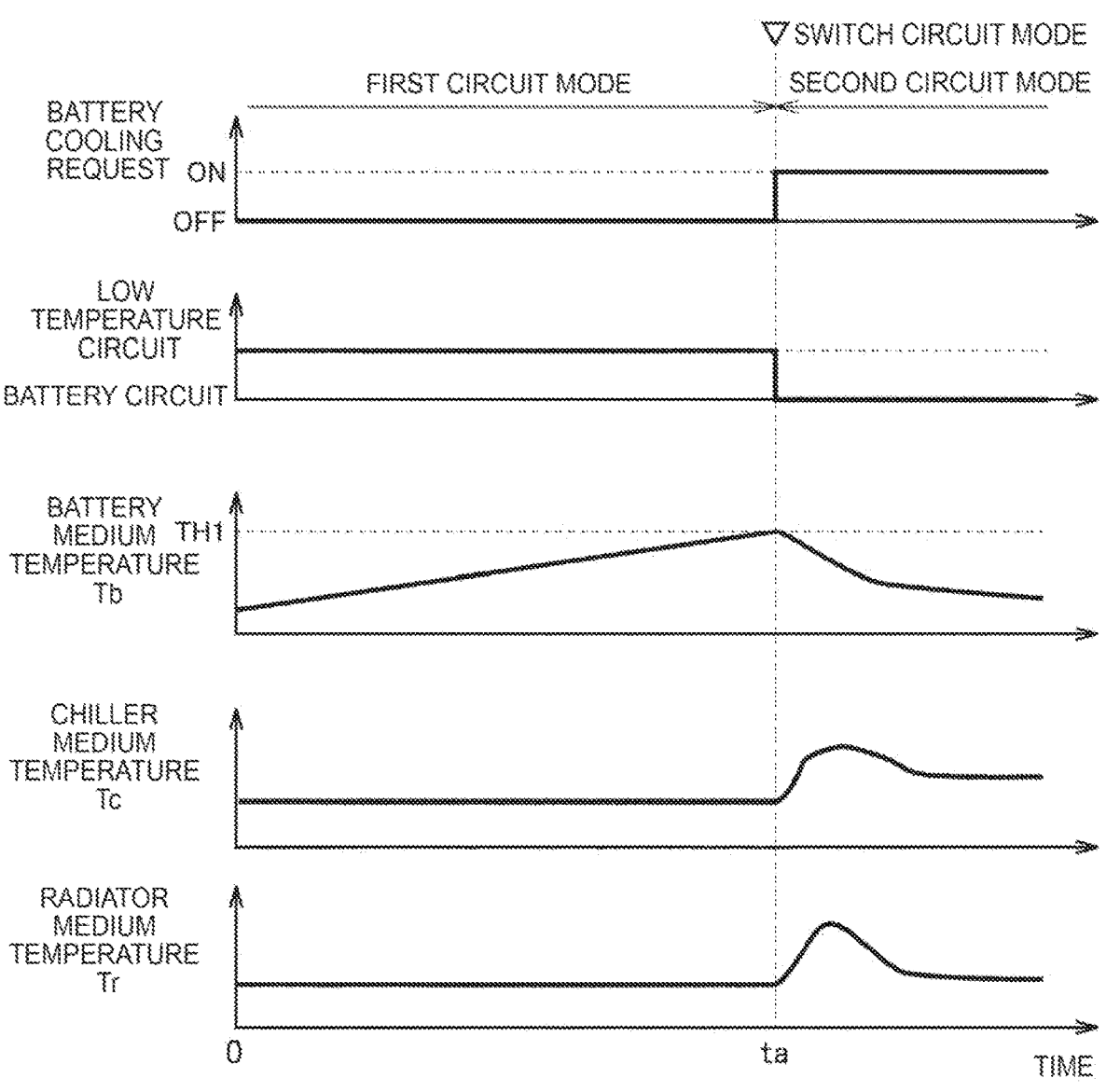
FIG. 5 is a first timing chart showing an example of changes in parameters with time during heating operation according to a comparative example.

FIG. 5 is a first timing chart showing an example of changes in parameters with time during the heating operation according to the comparative example. The abscissa represents elapsed time. The ordinate represents, from top to bottom, ON/OFF of a request to cool the battery 163 (battery cooling request), the circuit to which the chiller 142 is connected (low temperature circuit 130 or battery circuit 160), the battery medium temperature Tb, the chiller medium temperature Tc, and the radiator medium temperature Tr. The same applies to FIGS. 6 to 8 that will be described later.

At initial time 0, the battery cooling request is not generated (OFF), and the thermal management circuit 100 is operating in the first circuit mode (see FIG. 3). The battery medium temperature Tb increases with time, and reaches a threshold temperature TH1 (first threshold temperature) at time ta. At this time, the battery cooling request is generated (ON), and the thermal management circuit 100 switches from the first circuit mode to the second circuit mode (see FIG. 4).

With the switching from the first circuit mode to the second circuit mode, the heat medium heated by the battery 163 starts to flow through the chiller 142. Therefore, the amount of heat absorbed from the battery circuit 160 by the chiller 142 increases, and the chiller medium temperature Tc increases rapidly. As the amount of heat absorbed by the chiller 142 increases, the amount of heat dissipated from the condenser 141 to the high temperature circuit 110 also increases (see FIG. 2). This is detected as a rapid increase in radiator medium temperature Tr. The amount of heat for heating (amount of heat used for the heating operation) depends on the amount of heat dissipated from the condenser 141 to the high temperature circuit 110. Therefore, as the amount of heat dissipated from the condenser 141 increases, the amount of heat for heating increases rapidly, which causes a rapid increase in heating temperature. This may result in deterioration of air conditioning comfort.

The refrigeration cycle 150 is controlled so that the amount of heat dissipated from the condenser 141 to the high temperature circuit 110 changes slowly. However, this control is implemented by PI-controlling the rotational speed of the compressor 151 according to the deviation between the target and current values of the heating temperature. Since this PI control is necessarily delayed with respect to a change in amount of heat for heating, a rapid change in heating temperature cannot be avoided. This issue may be particularly noticeable in such a configuration as in the first embodiment in which no electric heater for heating the heat medium is provided between the chiller 142 and the three-way valve 112 and the amount of heat for heating strongly depends on the amount of heat dissipated from the condenser 141. An electric heater may be provided between the chiller 142 and the three-way valve 112.

Figure 6:
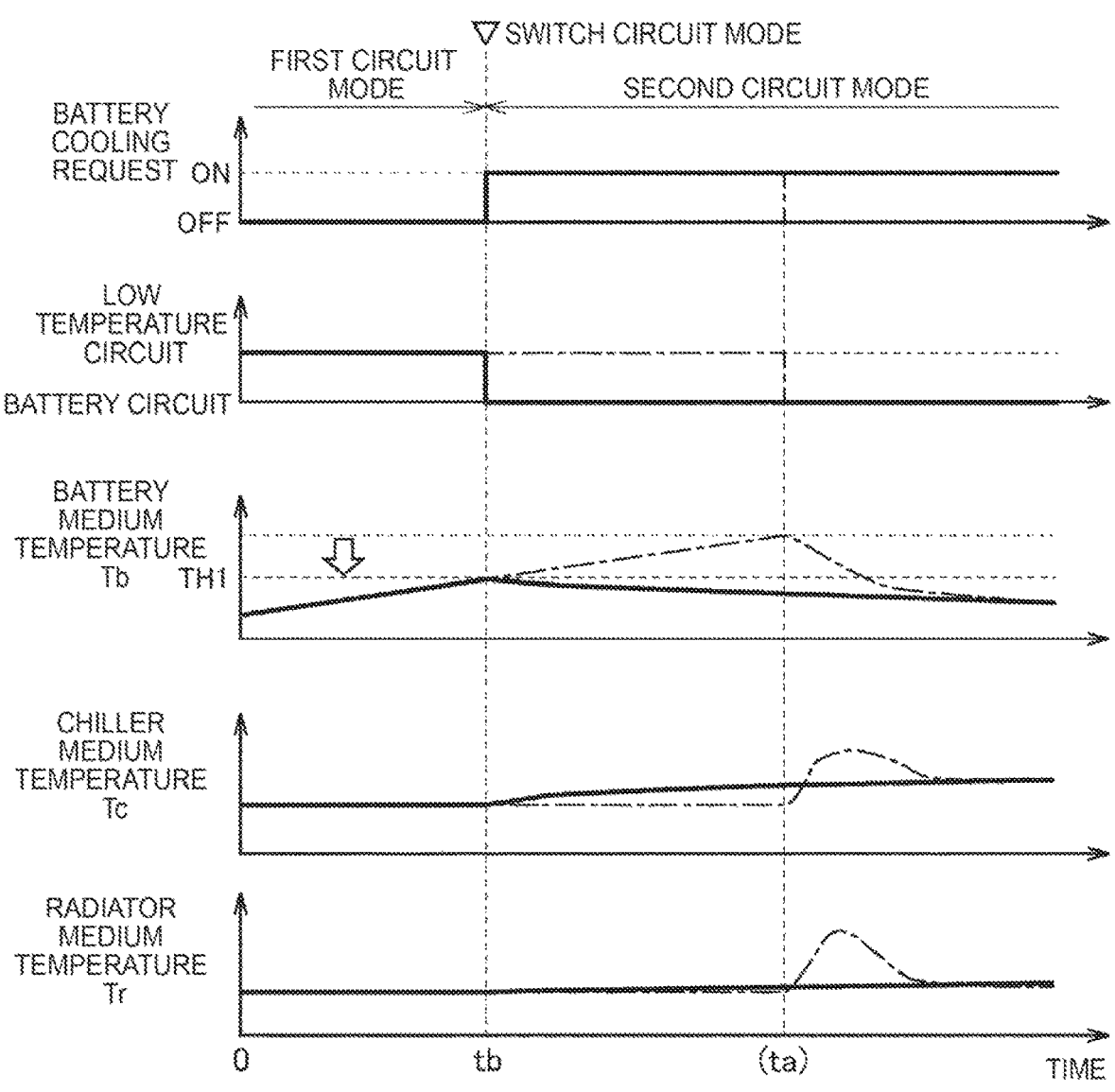
FIG. 6 is a first timing chart showing an example of changes in parameters with time during heating operation according to the first embodiment.

FIG. 6 is a first timing chart showing an example of changes in parameters with time during the heating operation according to the first embodiment. In order to facilitate understanding, the changes in parameters with time in the comparative example (changes in parameters with time shown in FIG. 5) are shown by long dashed short dashed lines in FIG. 6.

In the present embodiment, the threshold temperature TH1 is lowered to a value lower than that in the comparative example (see the down arrow). Accordingly, when the battery medium temperature Tb increases, it takes a shorter time for the battery medium temperature Tb to reach the threshold temperature TH1 (see time tb). As a result, the battery cooling request is generated earlier than in the comparative example, so that the thermal management circuit 100 switches from the first circuit mode to the second circuit mode earlier than in the comparative example. In other words, the circuit mode is switched to the second circuit mode before the battery medium temperature Tb increases excessively.

In the first circuit mode, the heat medium heated by the battery 163 does not flow through the chiller 142. With the switching to the second circuit mode, the heat medium heated by the battery 163 starts to flow through the chiller 142. In the present embodiment, the circuit mode is switched from the first circuit mode to the second circuit mode at an earlier timing. Therefore, at the time the circuit mode is switched to the second circuit mode, the battery medium temperature Tb is relatively low and is close to the chiller medium temperature Tc. As a result, an increase in amount of heat absorbed by the chiller 142 is relatively small, so that the chiller medium temperature Tc increases slowly. As the increase in amount of heat absorbed by the chiller 142 is reduced, an increase in amount of heat dissipated from the condenser 141 (i.e., amount of heat for heating) is also reduced. Therefore, the radiator medium temperature Tr also increases only slowly. As described above, according to the present embodiment, a rapid increase in heating temperature can be reduced and air conditioning comfort can be ensured by lowering the threshold temperature TH1.

After Start of Cooling

Next, the heating operation after the start of cooling of the battery 163 (i.e., during cooling) will be described by comparing a comparative example and the present embodiment.

Figure 7:
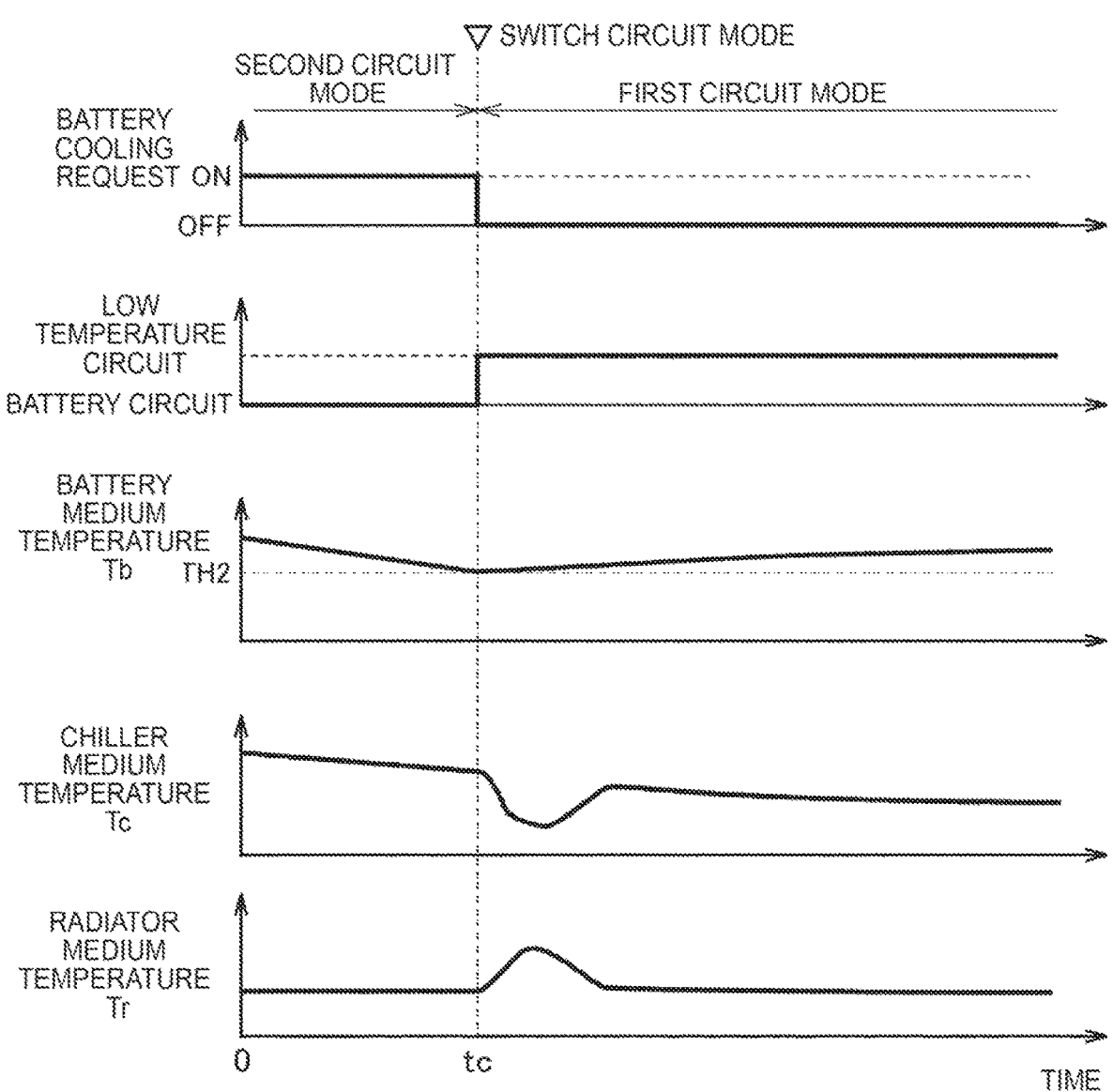
FIG. 7 is a second timing chart showing an example of changes in parameters with time during heating operation according to a comparative example.

FIG. 7 is a second timing chart showing an example of changes in parameters with time during the heating operation according to the comparative example. The situation assumed in the example shown in FIG. 7 is a situation where the chiller medium temperature Tc is higher during cooling of the battery 163 than after the cooling of the battery 163 ends, namely a situation where the chiller medium temperature Tc is higher than the radiator medium temperature Tr during cooling of the battery 163.

At initial time 0, the battery cooling request is generated (ON), and the thermal management circuit 100 is operating in the second circuit mode (see FIG. 4). The battery medium temperature Tb decreases with time, and reaches a threshold temperature TH2 (second threshold temperature) at time tc. At this time, the battery cooling request is canceled (OFF), and the thermal management circuit 100 switches from the second circuit mode to the first circuit mode (see FIG. 3).

With the switching from the second circuit mode to the first circuit mode, a common heat medium starts to flow through the chiller 142 and the low temperature radiator 122. In this example, the chiller medium temperature Tc is higher than the radiator medium temperature Tr. Therefore, the chiller medium temperature Tc decreases rapidly and the radiator medium temperature Tr increases rapidly so that the chiller medium temperature Tc and the radiator medium temperature Tr become closer to each other. As a result, the amount of heat dissipated from the heater core 113 to the low temperature radiator 122, that is, the amount of heat for heating, decreases, so that the heating temperature decreases rapidly. This may result in deterioration of air conditioning comfort.

Figure 8:
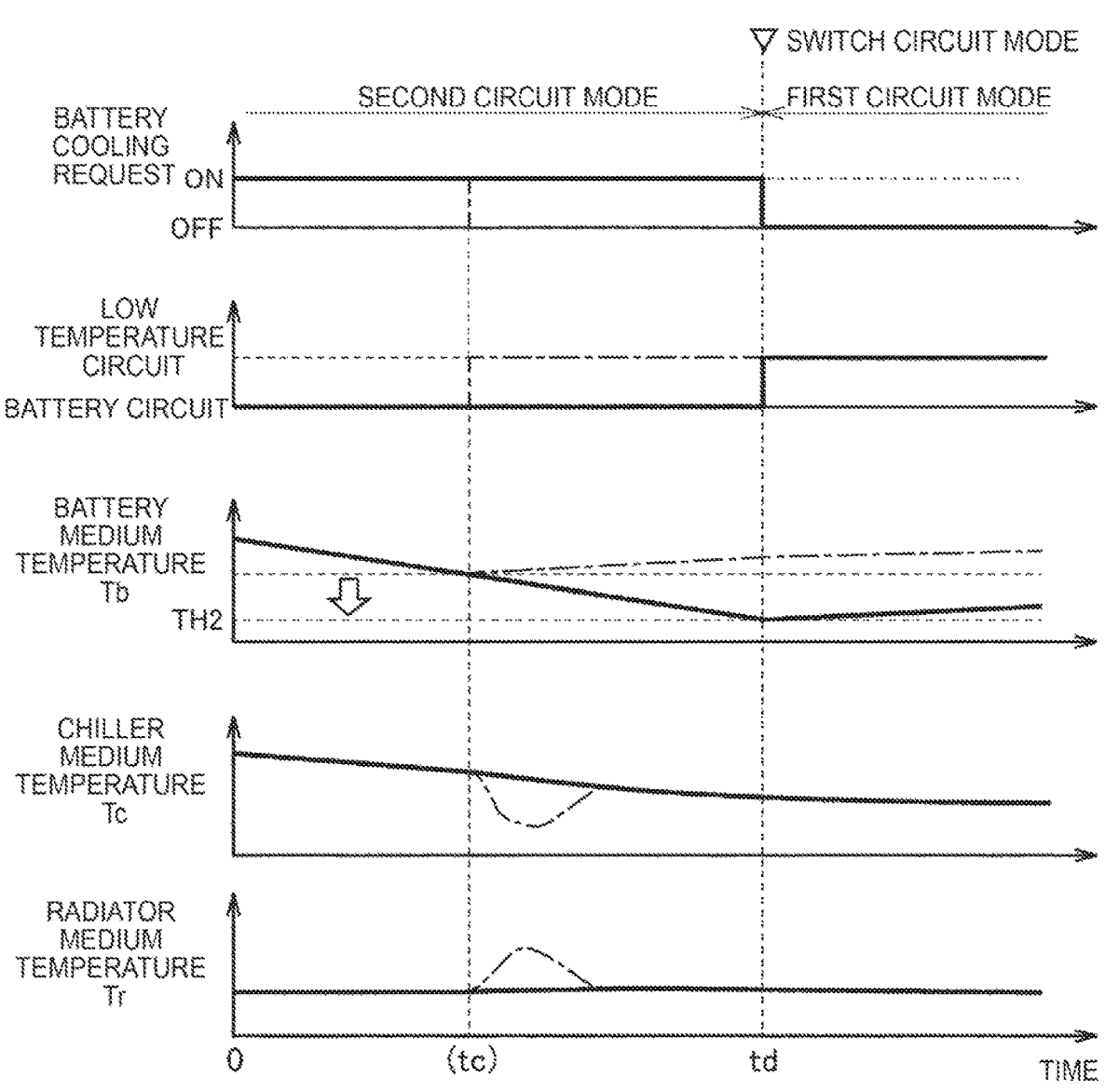
FIG. 8 is a second timing chart showing an example of changes in parameters with time during heating operation according to the first embodiment.

FIG. 8 is a second timing chart showing an example of changes in parameters with time during the heating operation according to the first embodiment. The changes in parameters with time in the comparative example (changes in parameters with time shown in FIG. 7) are shown by long dashed short dashed lines in FIG. 8.

In the present embodiment, the threshold temperature TH2 is lowered to a value lower than that in the comparative example (see the down arrow). Accordingly, when the battery medium temperature Tb decreases, it takes a longer time for the battery medium temperature Tb to reach the threshold temperature TH2 (see time td). As a result, the battery cooling request is canceled later than in the comparative example, so that the thermal management circuit 100 switches from the second circuit mode to the first circuit mode later than in the comparative example. In other words, the circuit mode will not be switched to the first circuit mode until the battery medium temperature Tb decreases sufficiently.

When the switching to the first circuit mode, a common heat medium starts to flow through the chiller 142 and the low temperature radiator 122. In the present embodiment, however, the circuit mode is switched from the second circuit mode to the first circuit mode at a later timing. Therefore, at the time the circuit mode is switched to the first circuit mode, the chiller medium temperature Tc is relatively low (Tc≈Tb in the second circuit mode) and is close to the radiator medium temperature Tr. Accordingly, the chiller medium temperature Tc decreases slowly, and the radiator medium temperature Tr increases slowly. As a result, a rapid decrease in amount of heat dissipated from the heater core 113 to the low temperature radiator 122 is reduced, and a rapid decrease in heating temperature is therefore reduced. As described above, according to the present embodiment, a rapid decrease in heating temperature can be reduced and air conditioning comfort can be ensured by lowering the threshold temperature TH2.

The situation where the chiller medium temperature Tc is higher during cooling of the battery 163 than after the cooling of the battery 163 ends (situation where the chiller medium temperature Tc is higher than the radiator medium temperature Tr during cooling of the battery 163) is described above with reference to FIGS. 7 and 8. There can be the opposite situation. That is, there can be a situation where the chiller medium temperature Tc is lower during cooling of the battery 163 than after the cooling of the battery 163 ends (situation where the chiller medium temperature Tc is lower than the radiator medium temperature Tr during cooling of the battery 163). In this case, the threshold temperature TH2 is raised. This can reduce a rapid increase in heating temperature and ensure air conditioning comfort.

Process Flow

Figure 9:
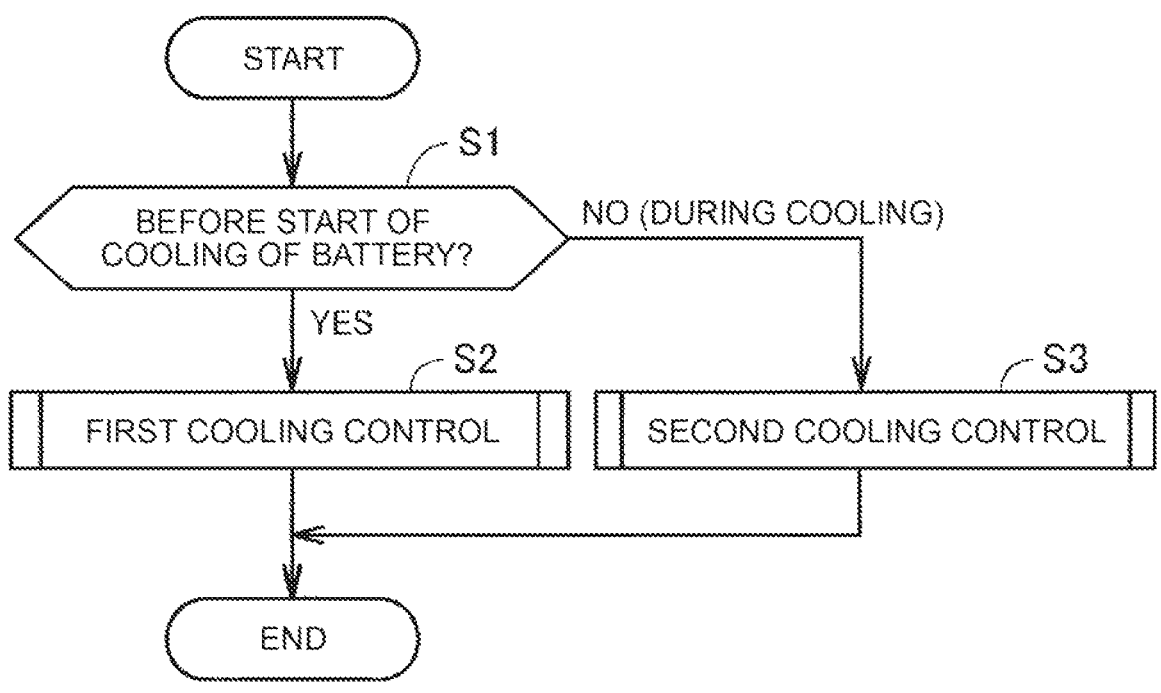
FIG. 9 is a flowchart showing a process of the heating operation according to the first embodiment.

FIG. 9 is a flowchart showing a process of the heating operation according to the first embodiment. The process shown in this flowchart is performed when a predetermined condition is satisfied (e.g., every predetermined cycle). The steps are implemented by software processing by the ECU 500. However, the steps may be implemented by hardware (electric circuitry) in the ECU 500. Hereinafter, the term "step" is abbreviated to "S."

In S1, the ECU 500 determines whether it is before the thermal management circuit 100 starts cooling of the battery 163. Whether it is before the start of cooling of the battery 163 can be determined by the presence or absence of the battery cooling request. When it is before the start of cooling of the battery 163 (YES in S1), the ECU 500 performs first cooling control (S2). When it is not before the start of cooling of the battery 163, in other words, when it is during cooling of the battery 163 (NO in S1), the ECU 500 performs second cooling control (S3).

Figure 10:
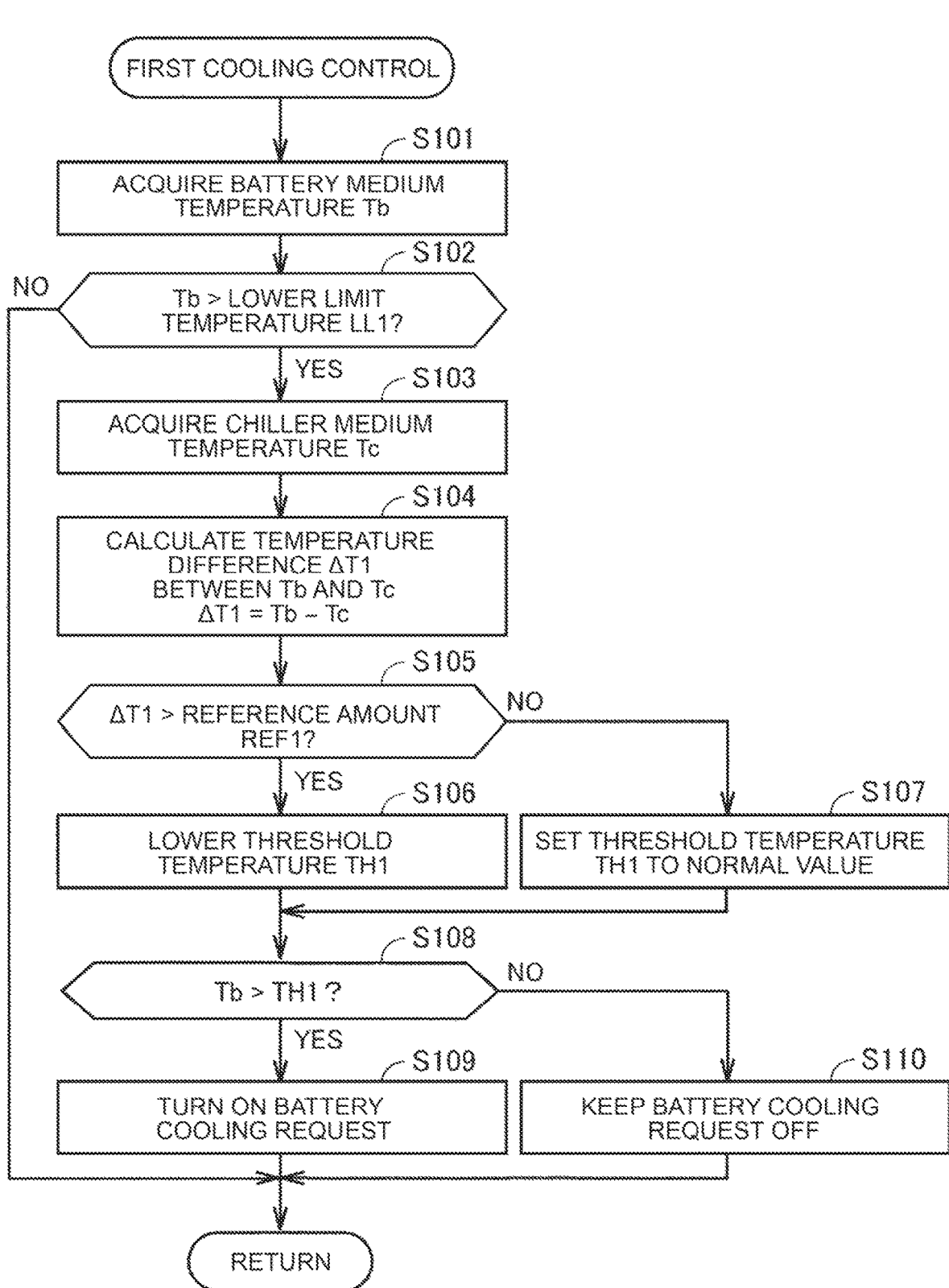
FIG. 10 is a flowchart showing an example of a process of first cooling control.

FIG. 10 is a flowchart showing an example of a process of the first cooling control (process of S2). The battery cooling request is OFF at the start of the first cooling control. Therefore, the thermal management circuit 100 is in the first circuit mode, and the chiller 142 is thermally connected to the low temperature radiator 122 (low temperature circuit 130) (see time tb in FIG. 6).

In S101, the ECU 500 acquires the battery medium temperature Tb from the temperature sensor 194.

In S102, the ECU 500 determines whether the battery medium temperature Tb is higher than a lower limit temperature LL1. The lower limit temperature LL1 is the lowest temperature within the temperature range in which cooling of the battery 163 can be started (within the temperature range in which the effect of cooling the battery 163 can be obtained), and is determined in advance. When the battery medium temperature Tb is equal to or lower than the lower limit temperature LL1 (NO in S102), it is expected that the effect of cooling the battery 163 will not be obtained. Therefore, the routine returns. The battery 163 thus continues not to be cooled. On the other hand, when the battery medium temperature Tb is higher than the lower limit temperature LL1 (YES in S102), the routine proceeds to S103.

In S103, the ECU 500 acquires the chiller medium temperature Tc from the temperature sensor 193. The timing to acquire the chiller medium temperature Tc is not particularly limited. The chiller medium temperature Tc may be acquired together with the battery medium temperature Tb, or may be acquired before the battery medium temperature Tb.

In S104, the ECU 500 calculates the temperature difference $\Delta T1$ (=Tb−Tc) between the battery medium temperature Tb and the chiller medium temperature Tc. The temperature difference $\Delta T1$ corresponds to the "first temperature difference" according to the present disclosure. The battery medium temperature Tb is high enough (e.g., 40° C.) that cooling of the battery 163 may be requested, and the chiller medium temperature Tc is low enough (e.g., 0° C.) that the vehicle cabin is heated. Therefore, the temperature difference $\Delta T1$ is positive (or 0).

In S105, the ECU 500 determines whether the temperature difference $\Delta T1$ is larger than a reference amount REF1. The reference amount REF1 is a value at which air conditioning comfort may deteriorate as described with reference to FIG. 5 unless the threshold temperature TH1 is lowered. The reference amount REF1 is determined in advance experimentally or by design.

When the temperature difference $\Delta T1$ is equal to or less than the reference amount REF1 (NO in S105), the ECU 500 sets the threshold temperature TH1 to a normal value (e.g., the temperature in the comparative example) (S107). On the other hand, when the temperature difference $\Delta T1$ is larger than the reference amount REF1 (YES in S105), the ECU 500 lowers the threshold temperature TH1 to a predetermined temperature lower than the normal value (S106). After S106 or S107, the routine proceeds to S108.

In S108, the ECU 500 determines whether the battery medium temperature Tb is higher than the threshold temperature TH1. When the battery medium temperature Tb is higher than the threshold temperature TH1 (YES in S108), the ECU 500 generates the battery cooling request (turns the battery cooling request from OFF to ON) (S109). The thermal management circuit 100 is therefore switched from the first circuit mode to the second circuit mode, and cooling of the battery 163 is started (see time ta or tb in FIG. 6). On the other hand, when the battery medium temperature Tb is equal to or lower than the threshold temperature TH1 (NO in S108), the ECU 500 keeps the battery cooling request OFF (S110). In this case, the thermal management circuit 100 remains in the first circuit mode.

Figure 11:
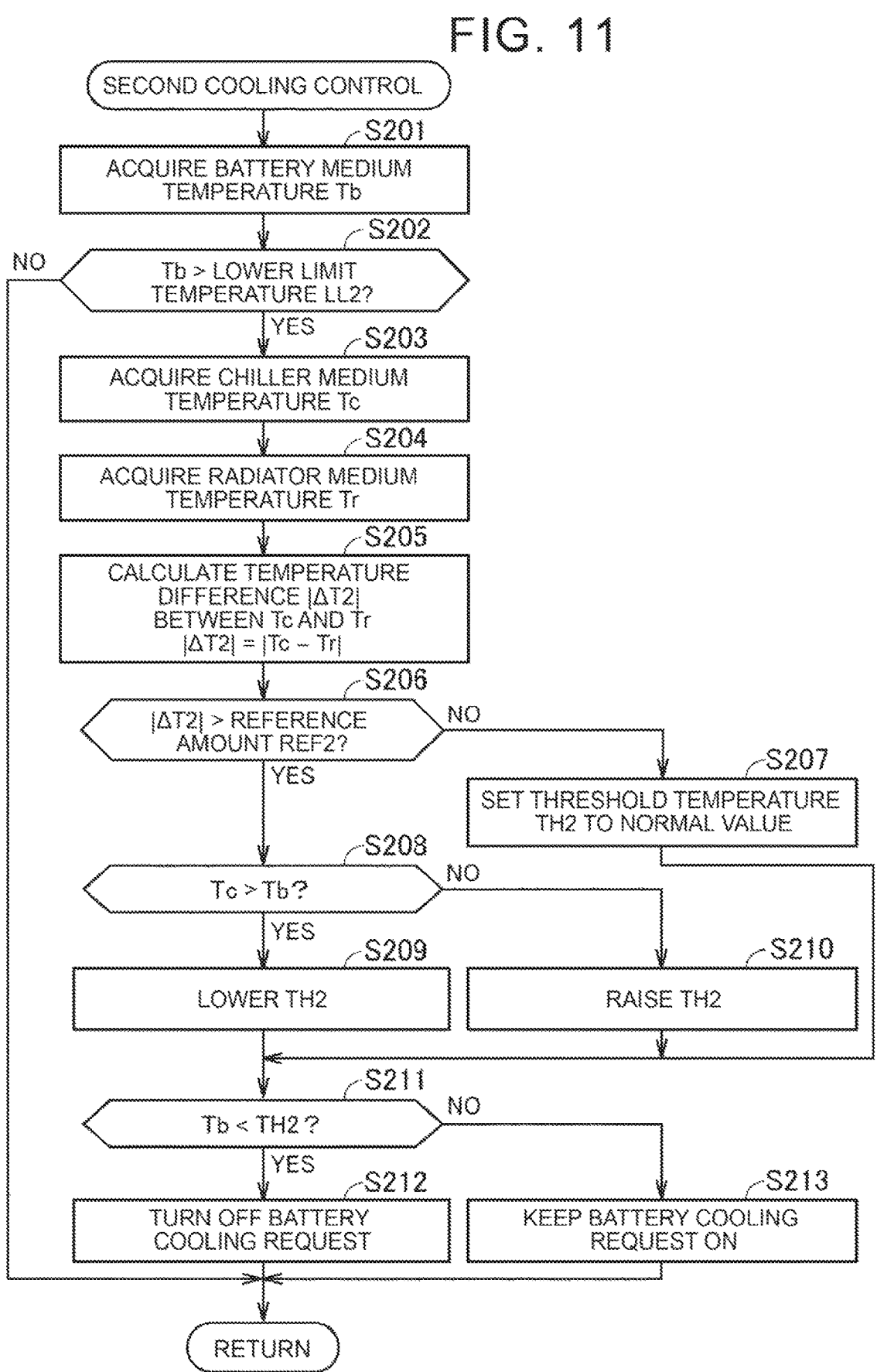
FIG. 11 is a flowchart showing an example of a process of second cooling control.

FIG. 11 is a flowchart showing an example of a process of the second cooling control (process of S3). The battery cooling request is ON at the start of the second cooling control. Therefore, the thermal management circuit 100 is in the second circuit mode, and the chiller 142 is thermally connected to the battery 163 (battery circuit 160) (see time td in FIG. 8).

In S201, the ECU 500 acquires the battery medium temperature Tb from the temperature sensor 194.

In S202, the ECU 500 determines whether the battery medium temperature Tb is higher than a lower limit temperature LL2. The lower limit temperature LL2 is the lowest temperature within the temperature range in which cooling of the battery 163 can be continued (within the temperature range in which the effect of cooling the battery 163 can be obtained), and is determined in advance. The lower limit temperature LL2 is typically higher than the lower limit temperature LL1, but may be equal to the lower limit temperature LL1. When the battery medium temperature Tb is equal to or lower than the lower limit temperature LL2 (NO in S202), it is expected that the effect of cooling the battery 163 will not be obtained. Therefore, the routine returns. The battery 163 thus continues not to be cooled. On the other hand, when the battery medium temperature Tb is higher than the lower limit temperature LL2 (YES in S202), the routine proceeds to S203.

In S203, the ECU 500 acquires the chiller medium temperature Tc from the temperature sensor 193. The ECU 500 also acquires the radiator medium temperature Tr from the temperature sensor 192 (S204). The timing to acquire these temperatures is also not particularly limited.

In S205, the ECU 500 calculates the temperature difference (absolute value) $|\Delta T2|(=|Tc-Tr|)$ between the chiller medium temperature Tc and the radiator medium temperature Tr. The temperature difference $|\Delta T2|$ corresponds to the "second temperature difference" according to the present disclosure.

In S206, the ECU 500 determines whether the temperature difference $|\Delta T2|$ is larger than a reference amount REF2. The reference amount REF2 is a value at which air conditioning comfort may deteriorate as described with reference to FIG. 7 unless the threshold temperature TH2 is changed. The reference amount REF2 is determined in advance experimentally or by design.

When the temperature difference $|\Delta T2|$ is equal to or less than the reference amount REF2 (NO in S206), the ECU 500 sets the threshold temperature TH2 to a normal value (e.g., the temperature in the comparative example) (S207). On the other hand, when the temperature difference $|\Delta T2|$ is larger than the reference amount REF2 (YES in S206), the routine proceeds to S208.

In S208, the ECU 500 determines whether the chiller medium temperature Tc is higher than the battery medium temperature Tb. When the chiller medium temperature Tc is higher than the battery medium temperature Tb (YES in S208), the ECU 500 lowers the threshold temperature TH2 to a predetermined temperature lower than the normal value (S209). On the other hand, when the chiller medium temperature Tc is lower than the battery medium temperature Tb (NO in S208), the ECU 500 raises the threshold temperature TH2 to another predetermined temperature higher than the normal value (S210). After S207, S209, or S210, the routine proceeds to S211.

In S211, the ECU 500 determines whether the battery medium temperature Tb is lower than the threshold temperature TH2. When the battery medium temperature Tb is lower than the threshold temperature TH2 (YES in S211), the ECU 500 cancels the battery cooling request (turns the battery cooling request from ON to OFF) (S212). The thermal management circuit 100 is therefore switched from the second circuit mode to the first circuit mode, and cooling of the battery 163 ends (see time tc or td in FIG. 8). On the other hand, when the battery medium temperature Tb is equal to or higher than the threshold temperature TH2 (NO in S211), the ECU 500 keeps the battery cooling request ON (S213). In this case, the thermal management circuit 100 remains in the second circuit mode.

As described above, in the first embodiment, when in a situation where the chiller medium temperature Tc is expected to increase or decrease rapidly in association with the circuit mode being switched to start or end cooling of the battery 163, the threshold temperature for the battery medium temperature Tb that triggers to start or end cooling of the battery 163 is changed.

More specifically, regarding starting cooling of the battery 163, the threshold temperature TH1 is lowered when the temperature difference ΔT1 between the battery medium temperature Tb and the chiller medium temperature Tc is larger than the reference amount REF1. Since the threshold temperature TH1 is lowered, the thermal management circuit 100 is switched from the first circuit mode to the second circuit mode at an earlier timing (see FIG. 6). That is, the circuit mode is switched before the battery medium temperature Tb increases excessively. Since the battery medium temperature Tb and the chiller medium temperature Tc are close to each other at the time the circuit mode is switched, an increase in amount of heat absorbed by the chiller 142 after the switching of the circuit mode is reduced, and an increase in amount of heat dissipated from the condenser 141 (i.e., the amount of heat for heating) after the switching of the circuit mode is also reduced. This can reduce a rapid increase in heating temperature and ensure air conditioning comfort.

Regarding ending cooling of the battery 163, the threshold temperature TH2 is lowered (Tc>Tr) or raised (Tc≤Tr) when the temperature difference |ΔT2| between the chiller medium temperature Tc and the radiator medium temperature Tr is larger than the reference amount REF2.

When Tc>Tr, the threshold temperature TH2 is lowered. The thermal management circuit 100 is therefore switched from the second circuit mode to the first circuit mode at a later timing (see FIG. 8). That is, the circuit mode is switched after the battery medium temperature Tb has sufficiently decreased. In the second circuit mode before the switching of the circuit mode, the chiller medium temperature Tc is substantially equal to the battery medium temperature Tb and is low enough. Since the chiller medium temperature Tc and the radiator medium temperature Tr are close to each other at the time the circuit mode is switched, the chiller medium temperature Tc decreases slowly and the radiator medium temperature Tr increases slowly after the switching of the circuit mode. As a result, a rapid decrease in amount of heat dissipated from the heater core 113 to the low temperature radiator 122 is reduced. This can reduce a rapid decrease in heating temperature and ensure air conditioning comfort.

On the other hand, when Tc≤Tr, the threshold temperature TH2 is raised. The thermal management circuit 100 is therefore switched from the second circuit mode to the first circuit mode at an earlier timing. That is, the circuit mode is switched before the battery medium temperature Tb decreases sufficiently. In this case, in the second circuit mode before the switching of the circuit mode, the chiller medium temperature Tc (≈Tb) is relatively high. Since the chiller medium temperature Tc and the radiator medium temperature Tr are close to each other at the time the circuit mode is switched, the chiller medium temperature Tc increases slowly and the radiator medium temperature Tr decreases slowly after the switching of the circuit mode. As a result, a rapid increase in amount of heat dissipated from the heater core 113 to the low temperature radiator 122 is reduced. This can reduce a rapid increase in heating temperature and ensure air conditioning comfort. According to the first embodiment, deterioration of air conditioning comfort can thus be reduced.

In addition, when the amount of heat absorbed by the chiller 142 increases rapidly with switching of the circuit mode, the pressure of the refrigerant in the refrigeration cycle 150 increases rapidly, which may damage the components of the refrigeration cycle 150 (expansion valves 152, 155, EPR 154, etc.). According to the first embodiment, a rapid increase in amount of heat absorbed by the chiller 142 is reduced. Therefore, damage to the components of the refrigeration cycle 150 can be reduced or prevented.

In the present embodiment, the configuration in which the chiller medium temperature Tc changes rapidly with switching between thermal connection and disconnection between the chiller 142 and the battery 163 is described as an example. As another example, the chiller medium temperature Tc may change rapidly with switching between thermal connection and disconnection between the chiller 142 and the oil cooler 134. This is because the amount of heat absorbed from the heat medium by the oil cooler 134 may change rapidly. Therefore, the "heat exchanger" according to the present disclosure may be the oil cooler 134, and the heating operation described with reference to FIGS. 9 to 11 may be applied to the oil cooler 134. In this case, the first circuit mode is a circuit mode in which the chiller 142 is thermally disconnected from the battery 163 and is thermally connected to the oil cooler 134. The second circuit mode is a circuit mode in which the chiller 142 is thermally connected to the battery 163.

Modification of First Embodiment

A thermal management system according to a modification of the first embodiment includes a thermal management circuit having a configuration different from that described in the first embodiment (see FIG. 2). The overall configuration of the thermal management system is the same as the configuration shown in FIG. 1.

Figure 12:
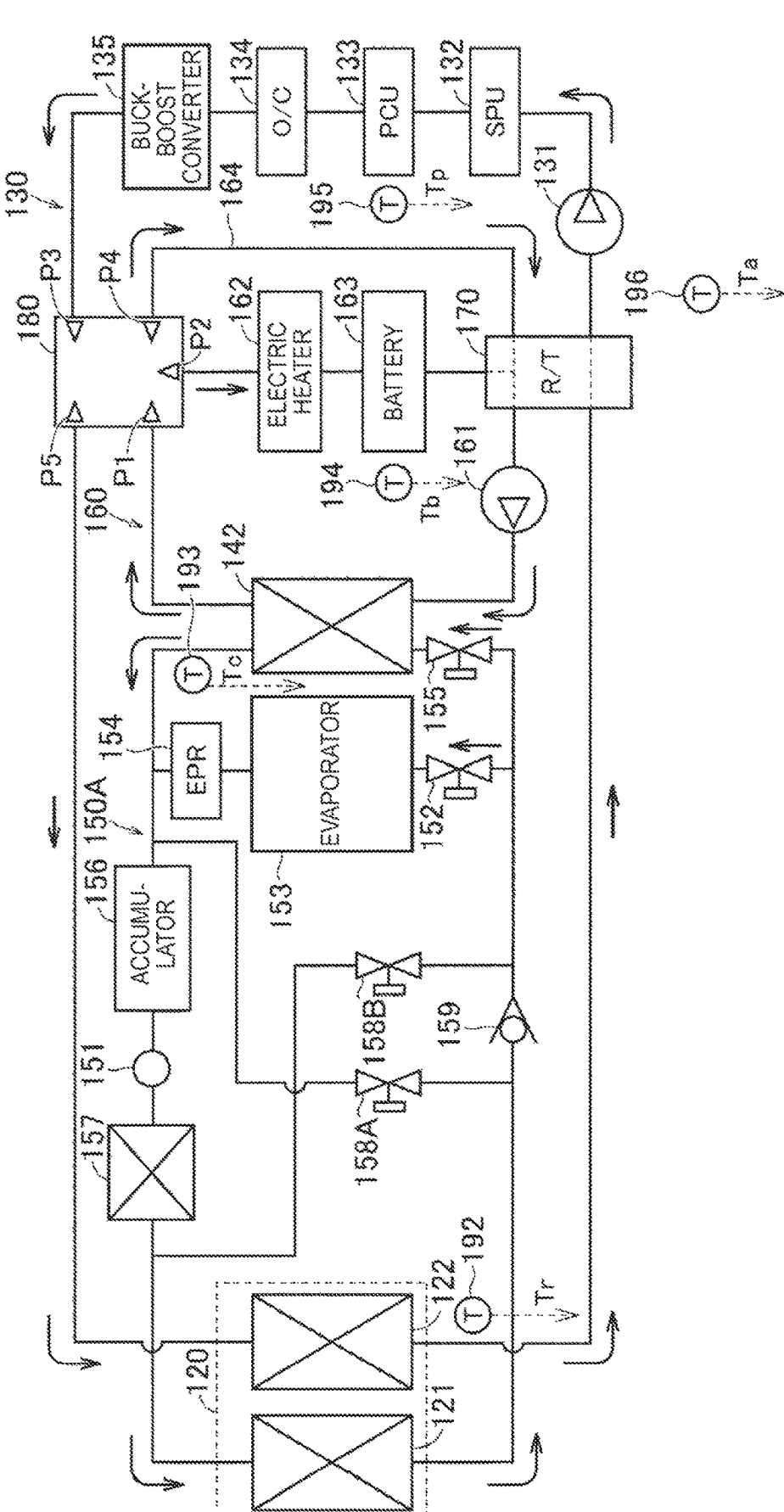
FIG. 12 shows the configuration of a thermal management circuit according to a modification of the first embodiment.

FIG. 12 shows the configuration of a thermal management circuit 100A according to the modification of the first embodiment. The thermal management circuit 100A is different from the thermal management circuit 100 shown in FIG. 2 in that the thermal management circuit 100A does not include the high temperature circuit 110 (water pump 111, three-way valve 112, heater core 113, and reservoir tank 114) and the temperature sensor 191 and includes a refrigeration cycle 150A instead of the refrigeration cycle 150. The refrigeration cycle 150A is different from the refrigeration cycle 150 in that the refrigeration cycle 150A further includes an accumulator 156, an indoor condenser 157, expansion valves 158A, 158B, and a check valve 159.

The accumulator 156 is connected upstream of the compressor 151 (refrigerant input side). The accumulator 156 separates the liquid-phase refrigerant and the gas-phase refrigerant, and causes the compressor 151 to suck only the gas-phase refrigerant.

The indoor condenser 157 is connected downstream of the compressor 151 (refrigerant output side). The indoor condenser 157 exchanges heat between the refrigerant flowing therethrough and air to heat the air.

The expansion valve 158A is connected to a pipe branching from upstream of the accumulator 156 and leading to the upstream side of the check valve 159. The expansion valve 158A decompresses and expands the refrigerant having passed through the chiller 142 and/or the EPR 154, and outputs the resultant refrigerant to the check valve 159.

The expansion valve 158B is connected to a pipe branching from downstream of the indoor condenser 157 and leading to the downstream side of the check valve 159. The expansion valve 158B expands the high-pressure liquid-phase refrigerant having passed through the indoor condenser 157 to change it into low-temperature, low-pressure wet vapor in a gas-liquid mixed state.

The check valve 159 is connected between the high temperature radiator 121 and the expansion valve 152 (between the high temperature radiator 121 and the expansion valve 155). The check valve 159 allows the flow of the refrigerant output from the high temperature radiator 121 but does not allow the reverse flow thereof.

Even in a system configuration using the thermal management circuit 100A, the ECU 500 performs the heating operation described in the first embodiment (see FIGS. 9 to 11). Since the heating operation is described in detail above, description thereof will not be repeated. Like the first embodiment, the modification of the first embodiment can also reduce deterioration of air conditioning comfort.

Second Embodiment

Although the configuration in which the "switching device" according to the present disclosure is a five-way valve is described in the first embodiment, the configuration of the "switching device" according to the present disclosure is not limited to this. The configuration in which the "switching device" according to the present disclosure is an eight-way valve will be described in a second embodiment. The overall configuration of a thermal management system is the same as the configuration shown in FIG. 1.

Figure 13:
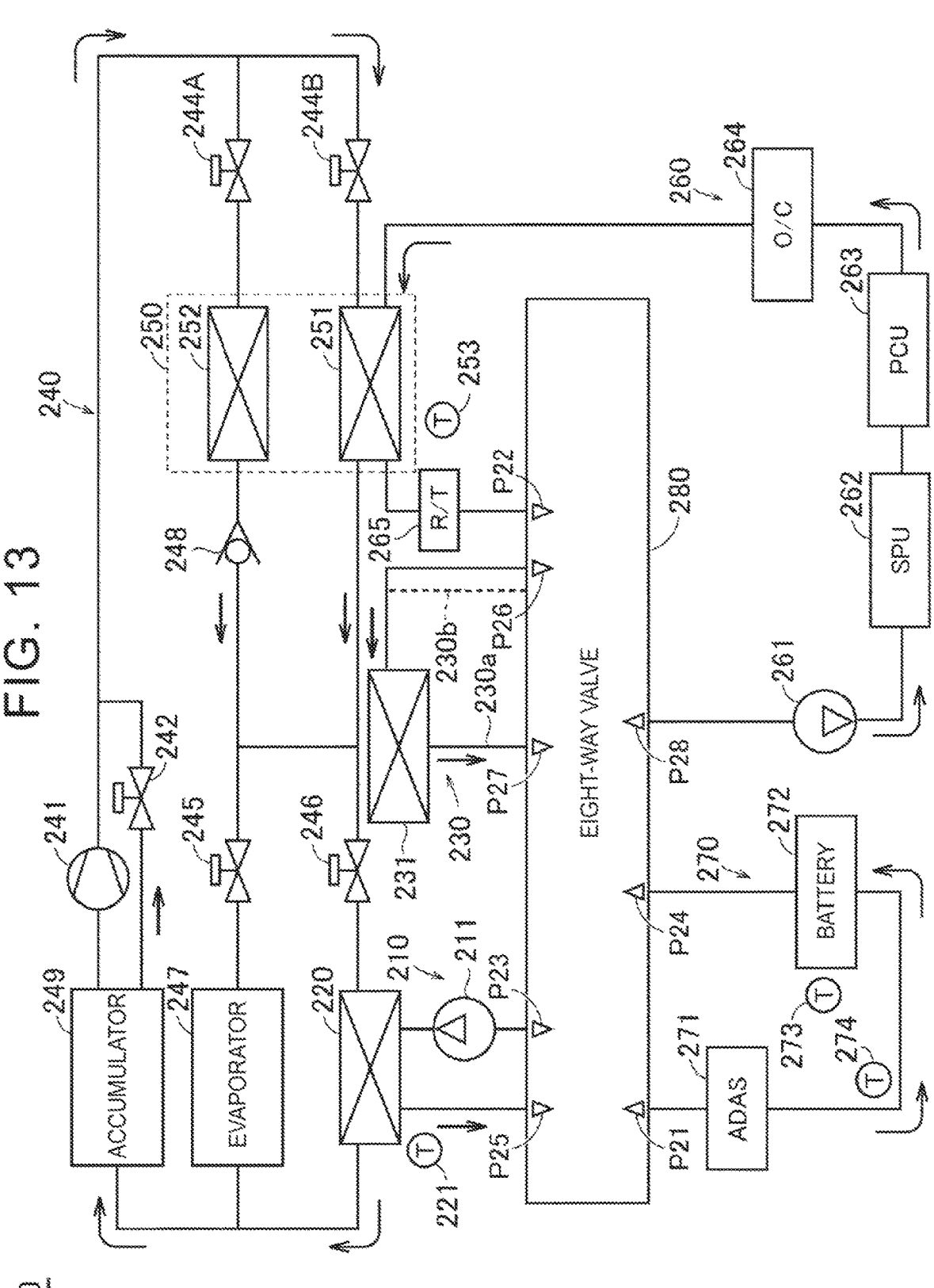
FIG. 13 shows the configuration of a thermal management circuit according to a second embodiment.

FIG. 13 shows the configuration of a thermal management circuit 200 according to the second embodiment. For example, the thermal management circuit 200 includes a chiller circuit 210, a chiller 220, a radiator circuit 230, a refrigeration cycle 240, a condenser 250, a drive unit circuit 260, a battery circuit 270, and an eight-way valve 280.

The chiller circuit 210 includes a water pump (W/P) 211 and a temperature sensor 221. The chiller 220 is connected to (shared by) both the chiller circuit 210 and the refrigeration cycle 240. The temperature sensor 221 detects the temperature of a heat medium flowing through the chiller 220 (chiller medium temperature Tc).

The radiator circuit 230 includes, for example, a flow path 230a that causes the heat medium to flow through a radiator 231 and a bypass path 230b that causes the heat medium to bypass the radiator 231.

The refrigeration cycle 240 includes, for example, a compressor 241, an electromagnetic valve 242, electromagnetic valves 244A, 244B, 245, and 246, an evaporator 247, a check valve 248, and an accumulator 249.

The condenser 250 includes a water-cooled condenser 251 and an air-cooled condenser 252, and the water-cooled condenser 251 is connected to both the refrigeration cycle 240 and the drive unit circuit 260. A temperature sensor 253 is provided for the condenser 250. The temperature sensor 253 detects the temperature of the heat medium flowing through the water-cooled condenser 251.

The drive unit circuit 260 includes, for example, a water pump 261, an SPU 262, a PCU 263, an oil cooler 264, and a reservoir tank 265. Instead of the oil cooler 264, a transaxle may be provided in the drive unit circuit 260.

The battery circuit 270 includes, for example, advanced driver-assistance systems (ADAS) 271, a battery 272, a battery temperature sensor 273, and a heat medium temperature sensor 274.

The eight-way valve 280 includes eight ports P21 to P28, and is connected to the chiller circuit 210, the radiator circuit 230, the drive unit circuit 260, and the battery circuit 270.

The heat medium circulating in the chiller circuit 210 flows through a path of "eight-way valve 280 (port P23)-water pump 211-chiller 220-eight-way valve 280 (port P25)."

The water pump 211 circulates the heat medium in the chiller circuit 210 according to a control command from the ECU 500. The chiller 220 exchanges heat between the heat medium circulating in the chiller circuit 210 and the refrigerant circulating in the refrigeration cycle 240. The eight-way valve 280 switches the path to which the chiller circuit 210 is connected according to a control command from the ECU 500. The switching of the path by the eight-way valve 280 will be described in detail later.

In the example shown in FIG. 13, the heat medium circulating in the radiator circuit 230 flows through a path of "eight-way valve (port P26)-radiator 231-eight-way valve 280 (port P27)." The radiator 231 is disposed downstream of a grille shutter (not shown), and exchanges heat between air outside the vehicle 10 and the heat medium.

In this example, the radiator 231 is provided in the flow path 230a of the radiator circuit 230. The bypass path 230b may be provided in parallel with the flow path 230a. The bypass path 230b is provided so as to connect a portion between the eight-way valve (port P26) and the radiator 231 and (a port, not shown, of) the eight-way valve 280. When the heat medium flows through the flow path 230a (radiator 231), the heat medium does not flow through the bypass path 230b. When the heat medium flows through the bypass path 230b, the heat medium does not flow through the radiator 231 (flow path 230a).

The refrigerant (gas-phase refrigerant or liquid-phase refrigerant) circulating in the refrigeration cycle 240 flows through any one of first to fourth paths. The first path is a path of "compressor 241-electromagnetic valves 244A-air-cooled condenser 252-check valve 248-electromagnetic valve 245-evaporator 247-accumulator 249-compressor 241." The second path is a path of "compressor 241-electromagnetic valves 244A-air-cooled condenser 252-check valve 248-electromagnetic valve 246-chiller 220-accumulator 249-compressor 241." The third path is a path of "compressor 241-electromagnetic valve 244B-water-cooled condenser 251-electromagnetic valve 245-evaporator 247-accumulator 249-compressor 241." The fourth path is a path of "compressor 241-electromagnetic valve 244B-water-cooled condenser 251-electromagnetic valve 246-chiller 220-accumulator 249-compressor 241."

The compressor 241 compresses the gas-phase refrigerant circulating in the refrigeration cycle 240 according to a control command from the ECU 500. The electromagnetic valve 242 is connected in parallel with the compressor 241, and adjusts the amount of gas-phase refrigerant flowing into the compressor 241 according to a control command from the ECU 500. The electromagnetic valves 244 (244A, 244B) switch between allowing the gas-phase refrigerant discharged from the compressor 241 to flow into the water-cooled condenser 251 and allowing the gas-phase refrigerant discharged from the compressor 241 to flow into the air-cooled condenser 252, according to a control command from the ECU 500. The water-cooled condenser 251 exchanges heat between the gas-phase refrigerant discharged from the compressor 241 and the heat medium flowing in the radiator circuit 230. The air-cooled condenser 252 exchanges heat with the water-cooled condenser 251 in the drive unit circuit 260. The electromagnetic valve (expansion valve) 245 restricts the flow of the liquid-phase refrigerant into the evaporator 247 according to a control command from the ECU 500. The electromagnetic valve 246 restricts the flow of the liquid-phase refrigerant into the chiller 220 according to a control command from the ECU 500. The electromagnetic valves 245, 246 also have a function to expand the liquid-phase refrigerant. The accumulator 249 removes the liquid-phase refrigerant from the refrigerant in a gas-liquid mixed state. The accumulator 249 thus prevents the liquid-phase refrigerant from being sucked into the compressor 241 when the refrigerant is not completely evaporated by the evaporator 247.

The heat medium (coolant) circulating in the drive unit circuit 260 flows through a path of "eight-way valve 280 (port P28)-water pump 261-SPU 262-PCU 263-oil cooler 264-water-cooled condenser 251-reservoir tank 265-eight-way valve 280 (port P22)."

The water pump 261 circulates the heat medium in the drive unit circuit 260 according to a control command from the ECU 500. The SPU 262 controls charge and discharge of the battery 272 according to a control command from the ECU 500. The PCU 263 converts DC power supplied from the battery 272 to AC power to supply the AC power to a motor (not shown) contained in the transaxle according to a control command from the ECU 500. The oil cooler 264 cools the transaxle through heat exchange between the heat medium circulating in the drive unit circuit 260 and the lubricating oil for the motor. The SPU 262, the PCU 263, and the oil cooler 264 are cooled by the heat medium circulating in the drive unit circuit 260. The water-cooled condenser 251 exchanges heat with the air-cooled condenser 252 in the refrigeration cycle 240. The reservoir tank 265 stores part of the heat medium flowing in the drive unit circuit 260 (heat medium that has overflowed due to a pressure increase) to maintain the pressure and amount of the heat medium in the drive unit circuit 260. The water-cooled condenser 251 corresponds to the "heat exchanger" according to the present disclosure. The temperature sensor 253 detects the temperature of the heat medium flowing through the water-cooled condenser 251.

The heat medium (coolant) circulating in the battery circuit 270 flows through a path of "eight-way valve 280 (port P21)-ADAS 271-battery 272-eight-way valve 280 (port P24)."

The ADAS 271 includes, for example, adaptive cruise control (ACC), auto speed limiter (ASL), lane keeping assist (LKA), pre-crash safety (PCS), and lane departure alert (LDA). The battery circuit 270 may include an autonomous driving system (ADS) in addition to the ADAS 271. The battery 272 supplies traction power to a motor generator contained in the transaxle. The battery temperature sensor 273 detects the temperature of the battery 272. The heat medium temperature sensor 274 detects the temperature of the heat medium flowing in the battery circuit 270 (battery medium temperature Tb).

Figure 14:
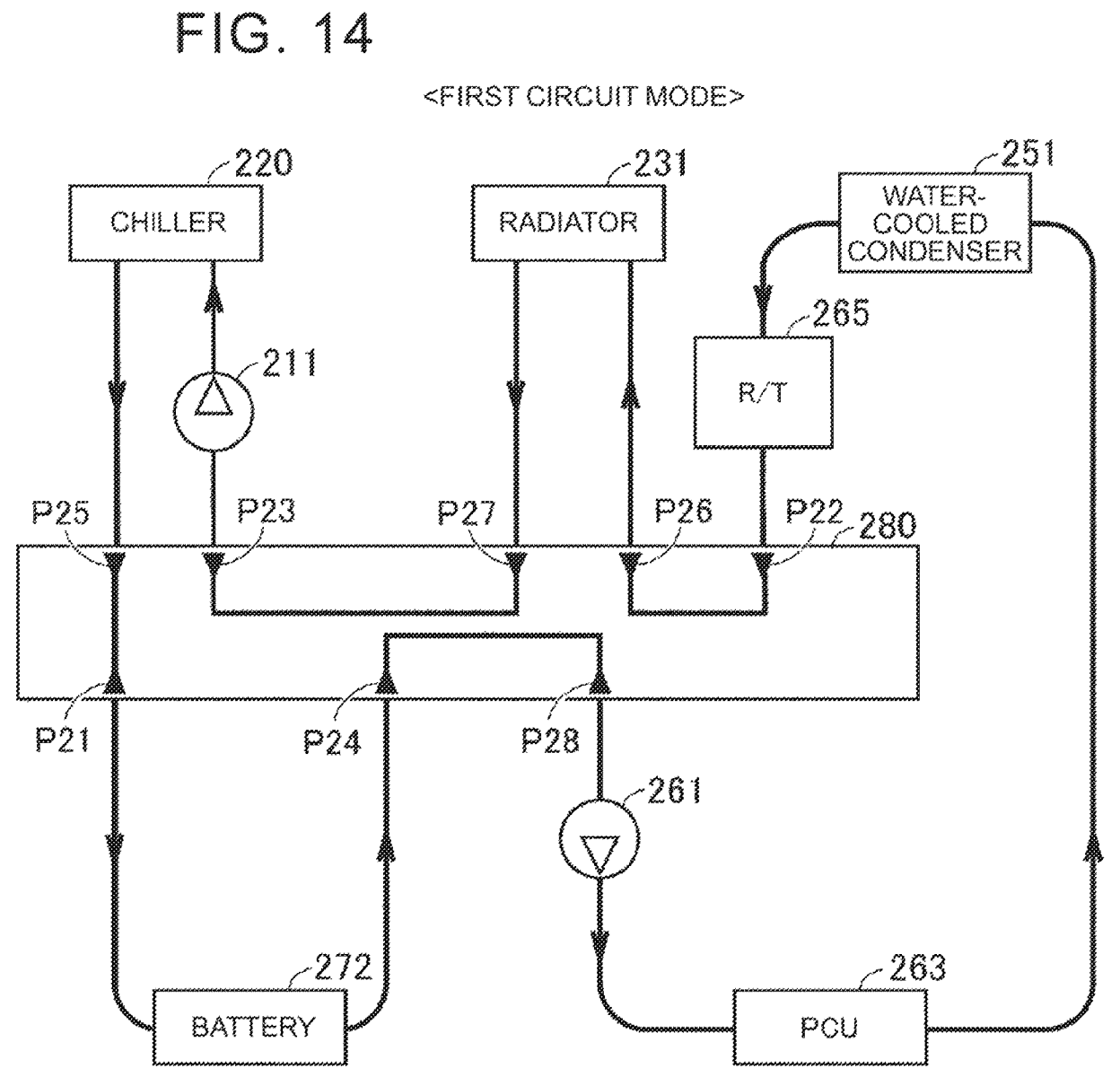

FIG. 14 illustrates an example of the first circuit mode according to the second embodiment. In the first circuit mode, for example, all of the battery circuit 270, the drive unit circuit 260, the radiator circuit 230, and the chiller circuit 210 are connected in series by the eight-way valve 280. More specifically, a path is formed such that the heat medium (coolant) flows in the order of the port P21, the battery 272, the port P24, the port P28, the water pump 261, the PCU 263, the water-cooled condenser 251, the reservoir tank 265, the port P22, the port P26, the radiator 231, the port P27, the port P23, the water pump 211, the chiller 220, the port P25, and the port P21.

Figure 15:
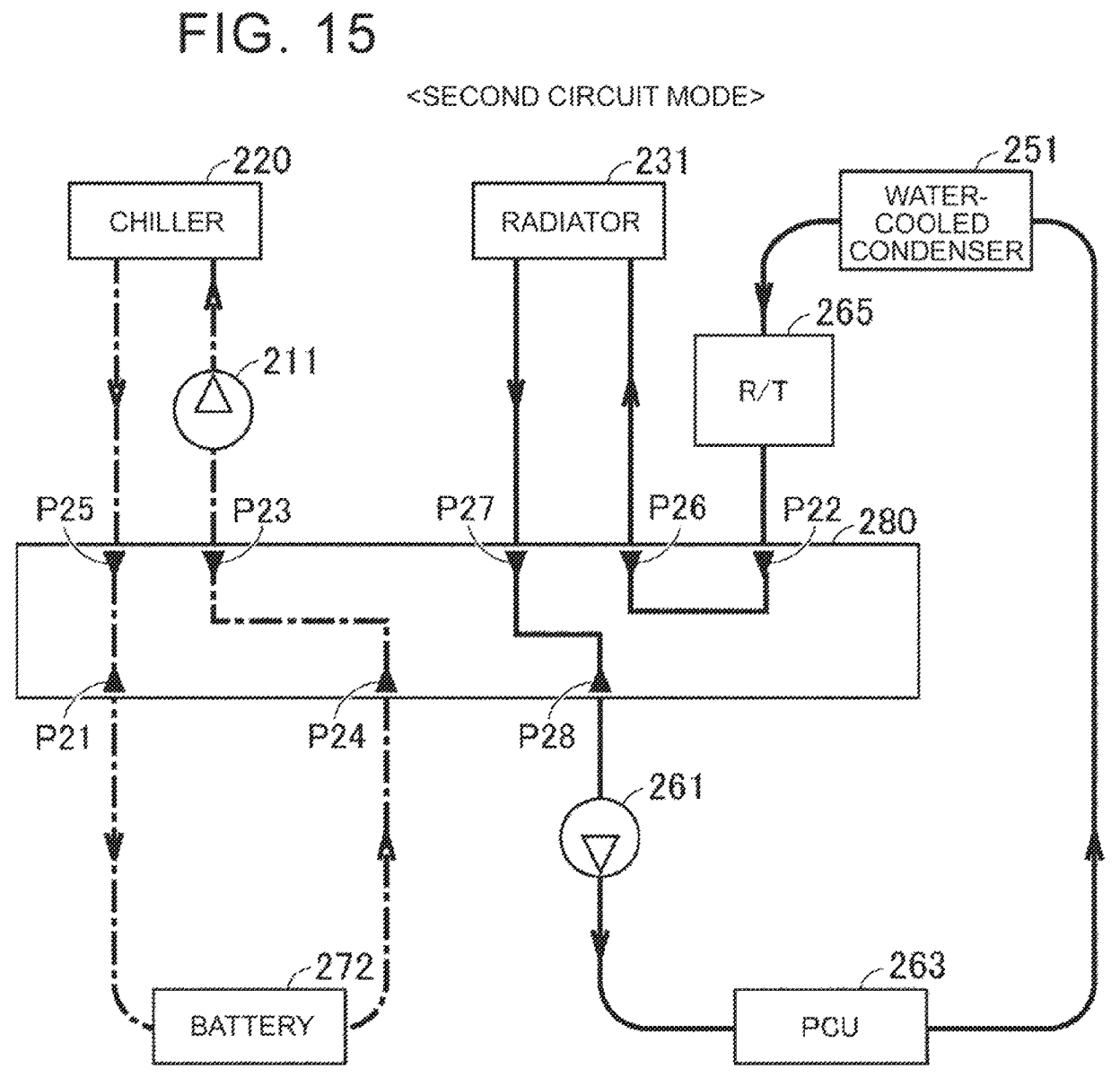

FIG. 15 illustrates an example of the second circuit mode according to the second embodiment. In the second circuit mode, for example, the battery circuit 270 and the chiller circuit 210 are connected in series and the drive unit circuit 260 and the radiator circuit 230 are connected in series by the eight-way valve 280. More specifically, a first path and a second path that are connected in parallel are formed. The first path is such a path that the heat medium flows in the order of the port P21, the battery 272, the port P24, the port P23, the water pump 211, the chiller 220, the port P25, and the port P21. The second path is such a path that the heat medium flows in the order of the port P28, the water pump 261, the PCU 263, the water-cooled condenser 251, the reservoir tank 265, the port P22, the port P26, the radiator 231, the port P27, and the port P28.

Even in a system configuration using the thermal management circuit 200, the ECU 500 performs the heating operation described in the first embodiment (see FIGS. 9 to 11). Since the heating operation is described in detail above, description thereof will not be repeated. Like the first embodiment, the second embodiment can also reduce deterioration of air conditioning comfort. The thermal management circuit 200 according to the second embodiment may include a high temperature circuit having the same functions as those of the high temperature circuit 110 according to the first embodiment.

Modification of Second Embodiment

The configuration in which the thermal management circuit includes two six-way valves instead of the eight-way valve 280 will be described in a modification of the second embodiment. The overall configuration of a thermal management system is the same as the configuration shown in FIG. 1.

Figure 16:
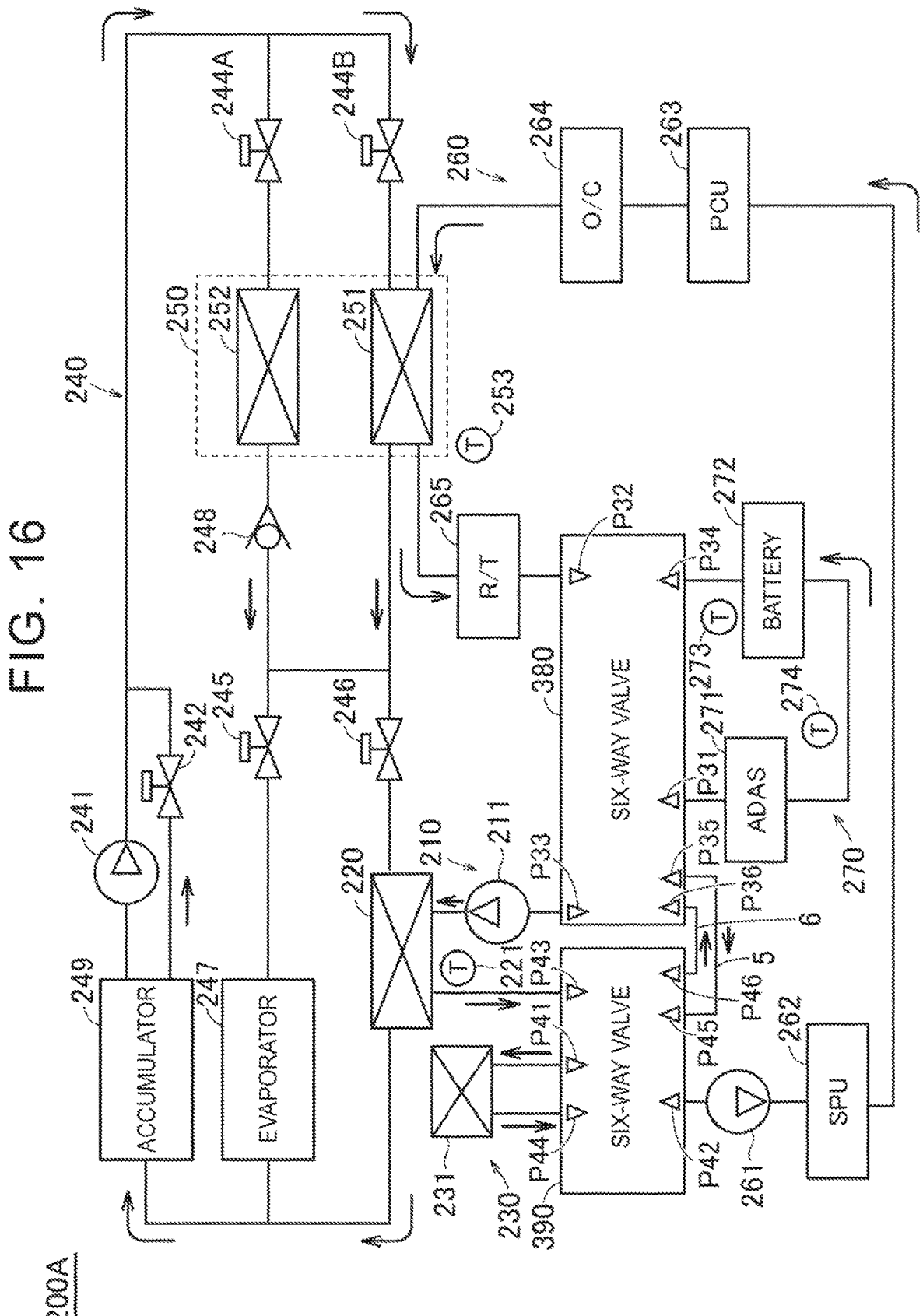
FIG. 16 shows the configuration of a thermal management circuit according to a modification of the second embodiment.

FIG. 16 shows the configuration of a thermal management circuit 200A according to the modification of the second embodiment. The thermal management circuit 200A includes a six-way valve 380 and a six-way valve 390 instead of the eight-way valve 280. The six-way valve 380 and the six-way valve 390 are an example of the "switching device" according to the present disclosure.

The six-way valve 380 includes six ports P31 to P36. The six-way valve 390 includes six ports P41 to P46. The six-way valve 380 and the six-way valve 390 are connected to each other. Specifically, the port P35 of the six-way valve 380 and the port P45 of the six-way valve 390 are connected by a flow path 5. The port P36 of the six-way valve 380 and the port P46 of the six-way valve 390 are connected by a flow path 6.

The heat medium (coolant) circulating in the chiller circuit 210 flows through a path of "six-way valve 380 (port P33)-water pump 211-chiller 220-six-way valve 390 (port P43)."

The heat medium circulating in the radiator circuit 230 flows through a path of "six-way valve 390 (port P41)-radiator 231-six-way valve 390 (port P44)."

The heat medium circulating in the drive unit circuit 260 flows through a path of "six-way valve 390 (port P42)-water pump 261-SPU 262-PCU 263-oil cooler 264-water-cooled condenser 251-reservoir tank 265-six-way valve 380 (port P32)."

The heat medium circulating in the battery circuit 270 flows through a path of "six-way valve 380 (port P31)-ADAS 271-battery 272-six-way valve 380 (port P34)."

As in the case where the eight-way valve 280 is used, the first circuit mode and the second circuit mode can also be formed using the two six-way valves 380, 390 (see FIGS. 14 and 15). Even in a system configuration using the thermal management circuit 200A, the ECU 500 performs the heating operation described in the first embodiment (see FIGS. 9 to 11). Like the first embodiment, the modification of the second embodiment can also reduce deterioration of air conditioning comfort.

The embodiments disclosed herein should be construed as illustrative in all respects and not restrictive. The scope of the present disclosure is shown by the claims rather than by the above description of the embodiments, and is intended to include all modifications within the meaning and scope equivalent to those of the claims.

What is claimed is:

1. A thermal management system, comprising:
a thermal management circuit; and
a control device comprising a processor and configured to control the thermal management circuit, wherein
the thermal management circuit includes
   a battery configured to allow a heat medium to flow through the battery,
   a heat exchanger configured to allow the heat medium to flow through the heat exchanger,
   a refrigeration cycle configured to allow a refrigerant to flow through the refrigeration cycle,
   a chiller configured to exchange heat between the heat medium and the refrigerant,
   a battery temperature sensor configured to detect a battery temperature, the battery temperature being a temperature of the heat medium flowing through the battery,
   a chiller temperature sensor configured to detect a chiller temperature, the chiller temperature being a temperature of the heat medium flowing through the chiller, and
   a switching device configured to switch the thermal management circuit between or among a plurality of circuit modes,
the circuit modes include
   a first circuit mode in which the chiller is thermally disconnected from the battery and is thermally connected to the heat exchanger, and
   a second circuit mode in which the chiller is thermally connected to the battery, and
the control device is configured to
   switch the thermal management circuit to the first circuit mode or the second circuit mode based on a relationship between the battery temperature and a threshold temperature, and
   when a predetermined condition that an amount of change in the chiller temperature associated with switching of the circuit mode of the thermal management circuit is expected to be larger than a reference amount is satisfied before the switching of the circuit mode, adjust the threshold temperature in such a manner that the amount of change in the chiller temperature becomes smaller than the reference amount.

2. The thermal management system according to claim 1, wherein
the threshold temperature includes a first circuit mode threshold temperature,
the control device is configured to control the thermal management circuit to the first circuit mode when the battery temperature becomes lower than the first circuit mode threshold temperature, the predetermined condition is satisfied when a first temperature difference between the chiller temperature and the battery temperature becomes larger than a first reference amount, and
the control device is configured to, when the predetermined condition is satisfied, set the first circuit mode threshold temperature to a value lower than when the first temperature difference is not larger than the first reference amount.

3. The thermal management system according to claim 1, wherein
the threshold temperature includes a second circuit mode threshold temperature,
the control device is configured to control the thermal management circuit to the second circuit mode when the battery temperature becomes higher than the second circuit mode threshold temperature,
the predetermined condition is satisfied when a second temperature difference between the chiller temperature and a heat exchanger temperature becomes larger than a second reference amount, the heat exchanger temperature being a temperature of the heat medium flowing through the heat exchanger,
the control device is configured to, when the predetermined condition is satisfied and the chiller temperature is higher than the battery temperature, set the second circuit mode threshold temperature to a value lower than when the second temperature difference is not larger than the second reference amount, and
the control device is configured to, when the predetermined condition is satisfied and the chiller temperature is lower than the battery temperature, set the second circuit mode threshold temperature to a value higher than when the second temperature difference is not larger than the second reference amount.

4. A vehicle comprising the thermal management system according to claim 1.

5. A method for controlling a thermal management circuit, the thermal management circuit including
   a chiller configured to exchange heat between a heat medium flowing through a battery and a heat exchanger and a refrigerant flowing through a refrigeration cycle, and
   a switching device configured to switch the thermal management circuit between or among a plurality of circuit modes, and
the circuit modes including
   a first circuit mode in which the chiller is thermally disconnected from the battery and is thermally connected to the heat exchanger, and
   a second circuit mode in which the chiller is thermally connected to the battery, the method comprising:
detecting a battery temperature, the battery temperature being a temperature of the heat medium flowing through the battery;
detecting a chiller temperature, the chiller temperature being a temperature of the heat medium flowing through the chiller;
switching the thermal management circuit to the first circuit mode or the second circuit mode based on a relationship between the battery temperature and a threshold temperature; and
when, before switching the thermal management circuit to the first circuit mode or the second circuit mode, an amount of change in the chiller temperature associated with switching of the circuit mode of the thermal management circuit is expected to be larger than a reference amount, adjusting the threshold temperature in such a manner that the amount of change in the chiller temperature becomes smaller than the reference amount.

6. The method according to claim 5, wherein the threshold temperature includes a first circuit mode threshold temperature, in switching the thermal management circuit to the first circuit mode or the second circuit mode, the thermal management circuit is switched to the first circuit mode when the battery temperature becomes lower than the first circuit mode threshold temperature, and in adjusting the threshold temperature in such a manner that the amount of change in the chiller temperature becomes smaller than the reference amount, when a first temperature difference between the chiller temperature and the battery temperature is larger than a first reference amount, the first circuit mode threshold temperature is set to a value lower than when the first temperature difference is not larger than the first reference amount.

7. The method according to claim 5, wherein the threshold temperature includes a second circuit mode threshold temperature, in switching the thermal management circuit to the first circuit mode or the second circuit mode, the thermal management circuit is switched to the second circuit mode when the battery temperature becomes higher than the second circuit mode threshold temperature, and in adjusting the threshold temperature in such a manner that the amount of change in the chiller temperature becomes smaller than the reference amount, when a second temperature difference between the chiller temperature and a heat exchanger temperature is larger than a second reference amount and the chiller temperature is higher than the battery temperature, the second circuit mode threshold temperature is set to a value lower than when the second temperature difference is not larger than the second reference amount, the heat exchanger temperature being a temperature of the heat medium flowing through the heat exchanger, and when the second temperature difference is larger than the second reference amount and the chiller temperature is lower than the battery temperature, the second circuit mode threshold temperature is set to a value higher than when the second temperature difference is not larger than the second reference amount.

* * * * *